(12) United States Patent
Seo et al.

(10) Patent No.: US 11,567,698 B2
(45) Date of Patent: Jan. 31, 2023

(54) STORAGE DEVICE CONFIGURED TO SUPPORT MULTI-STREAMS AND OPERATION METHOD THEREOF

(71) Applicant: Samsung Electronics Co., Ltd., Suwon-si (KR)

(72) Inventors: Jungmin Seo, Seongnam-si (KR); Byeonghui Kim, Hwaseong-si (KR); Kibeen Jung, Incheon (KR); Seungjun Yang, Hwaseong-si (KR)

(73) Assignee: Samsung Electronics Co., Ltd.

( * ) Notice: Subject to any disclaimer, the term of this patent is extended or adjusted under 35 U.S.C. 154(b) by 205 days.

(21) Appl. No.: 17/136,818

(22) Filed: Dec. 29, 2020

(65) Prior Publication Data

US 2021/0200477 A1 Jul. 1, 2021

(30) Foreign Application Priority Data

Dec. 31, 2019 (KR) .................. 10-2019-0178994

(51) Int. Cl.
  *G06F 3/06* (2006.01)
  *G06N 20/00* (2019.01)

(52) U.S. Cl.
  CPC .......... *G06F 3/0659* (2013.01); *G06F 3/0604* (2013.01); *G06F 3/0679* (2013.01); *G06N 20/00* (2019.01)

(58) Field of Classification Search
  CPC .... G06F 3/0604; G06F 3/0607; G06F 3/0629; G06F 3/0653; G06F 3/0656;

(Continued)

(56) References Cited

U.S. PATENT DOCUMENTS 6,785,688 B2  8/2004  Abajian et al.
7,496,565 B2  2/2009  Thind et al.
(Continued)

FOREIGN PATENT DOCUMENTS

KR  10-2019-0113479 A  10/2019

OTHER PUBLICATIONS

Bhimani, J. et al. "FIOS: Feature Based I/O Stream Identification for Improving Endurance of Multi-Stream SSDs." 2018 IEEE 11th International Conference on Cloud Computing (2018): pp. 17-24.
(Continued)

*Primary Examiner* — Larry T Mackall
(74) *Attorney, Agent, or Firm* — Fish & Richardson P.C.

(57) ABSTRACT

A storage device is configured to manage a plurality of nonvolatile memories with a plurality of physical streams. An operation method of the storage device includes receiving an input/output request from an external host device, determining a 0-th virtual stream identifier, extracting a 0-th representative value from a 0-th virtual stream feature, extracting a first and second representative values corresponding to first and second physical streams, calculating distance information including first and second similarities between the 0-th virtual stream and each of the first and second physical streams, based on the extracted representative values, assigning one of the plurality of physical streams to the 0-th virtual stream, based on the distance information, and performing an operation corresponding to the input/output request, at the assigned physical stream, and the extracting and the calculating are performed by using machine learning model.

20 Claims, 20 Drawing Sheets

(58) Field of Classification Search
CPC .... G06F 3/0659; G06F 3/0667; G06F 3/0679; G06F 3/0688; G06F 12/0246; G06F 2212/1016; G06F 2212/1036; G06F 2212/7201; G06F 2212/7203; G06F 2212/7205; G06F 2212/7208; G06N 3/0454; G06N 3/08; G06N 20/00
See application file for complete search history.

(56) References Cited

U.S. PATENT DOCUMENTS

| | | |
|---|---|---|
| 7,945,544 B2 | 5/2011 | Farber et al. |
| 8,352,540 B2 | 1/2013 | Anglin et al. |
| 9,639,549 B2 | 5/2017 | Goldberg et al. |
| 9,875,480 B2 | 1/2018 | Xiong et al. |
| 10,338,842 B2 | 7/2019 | Martineau et al. |
| 2018/0152715 A1* | 5/2018 | Sevin ............... H04N 19/154 |
| 2019/0147602 A1 | 5/2019 | Tao et al. |
| 2019/0205274 A1 | 7/2019 | Bhimani et al. |
| 2020/0152279 A1* | 5/2020 | Oh ................. G11C 11/5628 |
| 2021/0232499 A1* | 7/2021 | Yong ............... G06F 12/0253 |

OTHER PUBLICATIONS

Kim, T. et al. "Fully Automatic Stream Management for Multi-Streamed SSDs Using Program Contexts." 17th USENIX Conference on File and Storage Technologies (2019): pp. 295-308.

Lim, S. and D. Shin. "DStream: Dynamic Memory Resizing for Multi-Streamed SSDs." 2019 34th International Technical Conference on Circuits/Systems, Computers and Communications (ITC-CSCC), Jun. 23-26, 2019.

Hwanjin Yong et al., "vStream: Virtual Stream Management for Multi-streamed SSDs," Jul. 9-10, 2018.

Changwoo Min et al., "SFS Random Write Considered Harmful in Solid State Drives," Feb. 14-17, 2012.

Taejin Kim et al., "PCStream Automatic Stream Allocation Using Program Contexts," Jul. 9-10, 2018.

G. Koch et al. "Siamese Neural Networks for One-Shot Image Recognition" Proceedings of the 32 nd International Conference on Machine Learning, Lille, France, 2015. JMLR: W&CP vol. 37. Copyright 2015 by the author(s).

Jin Hwan Do et al. "Clustering approaches to identifying gene expression patterns from DNA microarray data" ResearchGate, Molecules and Cells • May 2008.

* cited by examiner

SMT

| Physical Stream | PSID1 | PSID2 | PSID3 | PSID4 |
|---|---|---|---|---|
| Virtual Stream | VSID11 | VSID21 | VSID31 | VSID41 |
| | VSID12 | VSID22 | VSID32 | VSID42 |
| | VSID13 | VSID23 | VSID33 | VSID43 |
| | VSID14 | VSID24 | VSID34 | VSID44 |
| | ⋮ | ⋮ | ⋮ | ⋮ |
| | VSID1m | VSID2n | VSID3k | VSID4i |

STORAGE DEVICE CONFIGURED TO SUPPORT MULTI-STREAMS AND OPERATION METHOD THEREOF

CROSS-REFERENCE TO RELATED APPLICATIONS

This application claims priority under 35 U.S.C. § 119 to Korean Patent Application No. 10-2019-0178994 filed on Dec. 31, 2019, in the Korean Intellectual Property Office, the entire contents of which are incorporated herein by reference.

TECHNICAL FIELD

At least some example embodiments of the inventive concepts described herein relate to a semiconductor memory, and more particularly, relate to a storage device configured to support a multi-stream and an operation method thereof.

BACKGROUND

A semiconductor memory device is classified as a volatile memory device, in which stored data disappears when a power is turned off, such as a static random access memory (SRAM) or a dynamic random access memory (DRAM), or a nonvolatile memory device, in which stored data is retained even when a power is turned off, such as a flash memory device, a phase-change RAM (PRAM), a magnetic RAM (MRAM), a resistive RAM (RRAM), or a ferroelectric RAM (FRAM).

Nowadays, a flash memory-based solid state drive (SSD) is being widely used as a high-capacity storage medium of a computing system. A host using the SSD may generate various kinds of data depending on applications. The host may provide information about data to the storage device together with the data for the purpose of improving an operation of the storage device. However, information about data that the host is capable of providing is restrictive due to a limitation on hardware of the SSD.

SUMMARY

At least some example embodiments of the inventive concepts provide a storage device with improved performance and improved lifetime and an operation method thereof, by mapping a virtual stream from a host and a physical stream based on distance information (i.e., similarity) between the virtual stream and physical streams managed within the storage device.

According to at least some example embodiments, an operation method of a storage device configured to manage a plurality of nonvolatile memories with a plurality of physical streams includes receiving an input/output request from an external host device; determining a 0-th virtual stream identifier corresponding to the received input/output request; extracting a 0-th representative value from a 0-th virtual stream feature of a 0-th virtual stream corresponding to the determined 0-th virtual stream identifier; extracting a first representative value and a second representative value respectively corresponding to a first physical stream and a second physical stream of the plurality of physical streams; calculating distance information including a first similarity between the 0-th virtual stream and the first physical stream and a second similarity between the 0-th virtual stream and the second physical stream, based on the extracted 0-th, first, and second representative values; assigning one of the plurality of physical streams to the 0-th virtual stream, based on the distance information; and performing an operation corresponding to the input/output request, at the assigned physical stream, and wherein the extracting of the 0-th representative value, the extracting of the first representative value and the second representative value, and the calculating of the distance information are performed by using a learning model learned in advance through machine learning.

According to at least some example embodiments, a storage device includes a plurality of nonvolatile memories; and a storage controller including processing circuitry configured to manage the plurality of nonvolatile memories with a plurality of physical streams and to assign one of the plurality of physical streams to a 0-th virtual stream corresponding to an input/output request from an external host device, wherein the storage controller further includes a memory configured to store stream information including a plurality of virtual stream features respectively corresponding to the plurality of physical streams, and wherein the processing circuitry is configured to, based on a machine learning model learned in advance through machine learning, extract a 0-th representative value from a 0-th virtual stream feature corresponding to the 0-th virtual stream, extract a plurality of representative values respectively corresponding to the plurality of physical streams from the stream information, calculate distance information indicating a similarity between the 0-th virtual stream and each of the plurality of physical streams, based on the extracted 0-th representative value and the extracted plurality of representative values, and assign one of the plurality of physical streams to the 0-th virtual stream based on the distance information.

According to at least some example embodiments, an operation method of a storage device configured to manage a plurality of nonvolatile memories with a plurality of physical streams includes receiving an input/output request from an external host device, determining a 0-th virtual stream identifier corresponding to the received input/output request, extracting a 0-th representative value from a 0-th virtual stream feature of a 0-th virtual stream corresponding to the determined 0-th virtual stream identifier, obtaining a first representative value and a second representative value respectively corresponding to a first physical stream and a second physical stream of the plurality of physical streams from a representative value pool, calculating distance information including a first similarity between the 0-th virtual stream and the first physical stream and a second similarity between the 0-th virtual stream and the second physical stream, based on the obtained first and second representative values, assigning one of the plurality of physical streams to the 0-th virtual stream, based on the distance information, performing an operation corresponding to the input/output request, at the assigned physical stream, and updating the representative value pool based on the 0-th representative value and a physical stream identifier corresponding to the assigned physical stream. The extracting of the 0-th representative value and the calculating of the distance information are performed by using a learning model learned in advance through machine learning.

According to at least some example embodiments, an operation method of a storage device configured to manage a plurality of nonvolatile memories with a plurality of physical streams includes receiving an input/output request from an external host device, determining a burstness of the input/output request based on a logical block address of the input/output request, storing data corresponding to the input/output request in a data buffer, when the input/output request has the burstness, extracting a 0-th representative value of the data stored in the data buffer, when a size of the data stored in the data buffer is a reference value or greater, extracting a first representative value and a second representative value respectively corresponding to a first physical stream and a second physical stream of the plurality of physical streams, calculating distance information including a first similarity between the data stored in the data buffer and the first physical stream and a second similarity between the data stored in the data buffer and the second physical stream, based on the extracted 0-th, first, and second representative values, assigning one of the plurality of physical streams to the data stored in the data buffer, based on the distance information, and storing the data stored in the data buffer in the assigned physical stream. The extracting of the 0-th representative value, the extracting of the first representative value and the second representative values, and the calculating of the distance information are performed by using a learning model learned in advance through machine learning.

BRIEF DESCRIPTION OF THE FIGURES

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Below, at least some example embodiments of the inventive concepts are described in detail.

Components described in the specification by using the terms "part", "unit", "module", "engine", etc. and function blocks illustrated in drawings may be implemented with software, hardware, or a combination thereof. The software may be computer-readable instructions stored in memory of one or more processors that are configured to execute the computer-readable instructions. For example, the software may be a machine code, firmware, an embedded code, and/or application software including computer-readable instructions that are stored in memory of one or more processors and executed by the one or more processors. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof. Also, unless differently defined, all terms used herein, which include technical terminologies or scientific terminologies, have the same meaning as that understood by one skilled in the art. Terms defined in a generally used dictionary are to be interpreted to have meanings equal to the contextual meanings in a relevant technical field, and are not interpreted to have ideal or excessively formal meanings unless clearly defined in the specification.

Figure 1:
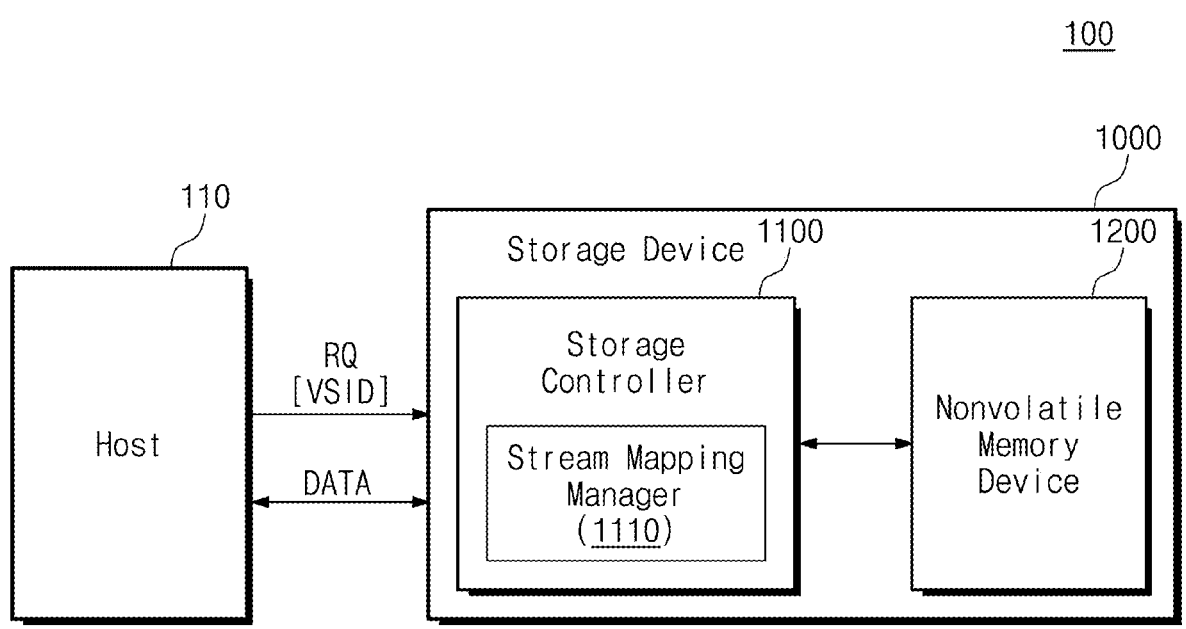
FIG. 1 is a block diagram illustrating a storage system according to at least one example embodiment of the inventive concepts.

FIG. 1 is a block diagram illustrating a storage system according to at least one example embodiment of the inventive concepts. Referring to FIG. 1, a storage system 100 may include a host 110 and a storage device 1000. According to at least one example embodiment of the inventive concepts, the storage system 100 may be a storage system of an information processing device which is configured to process a variety of information and to store the processed information. Examples of information processing devices that may have, as a storage system, the storage system 100 include, but are not limited to, a personal computer (PC), a laptop, a server, a workstation, a smartphone, a tablet PC, a digital camera, and a black box.

The host 110 may control overall operations of the storage system 100. For example, the host 110 may transmit, to the storage device 1000, a request RQ for storing data "DATA" in the storage device 1000 or reading the data "DATA" stored in the storage device 1000.

The storage device 1000 may include a storage controller 1100 and a nonvolatile memory device 1200. In response to the request RQ from the host 110, the storage controller 1100 may store the data "DATA" received from the host 110 in the nonvolatile memory device 1200 or may transfer the data "DATA" stored in the nonvolatile memory device 1200 to the host 110.

According to at least one example embodiment of the inventive concepts, the host 110 may manage the data "DATA" stored in the storage device 1000, based on a virtual stream VS. For example, the host 110 may assign a virtual stream identifier VSID to data to be stored in the storage device 1000, based on attributes of the data. That is, data of the same attributes or similar attributes may managed by the same virtual stream identifier VSID.

According to at least one example embodiment of the inventive concepts, the storage device 1000 may support a multi-stream function of managing a storage space of the nonvolatile memory device 1200 based on a physical stream PS. In this case, the number of physical streams that are managed or supported by the storage device 1000 may be different form the number of virtual streams that are managed by the host 110. For example, the number of physical streams may be less than the number of virtual streams. In other words, in the case where the number of virtual streams to be managed by the host 110 is "n", the number of physical streams that are managed or supported by the storage device 1000 may be "m," where "m" and "n" are both positive integers and "m" is smaller than "n". According to at least one example embodiment of the inventive concepts, the number of physical streams that are managed by the storage device 1000 may be managed or designated based on a resource (e.g., a data buffer) of the storage device 1000. That is, there may be required a means for mapping a plurality of virtual streams to a relatively small number of physical streams.

The storage controller 1100 of the storage device 1000 according to at least one example embodiment of the inventive concepts may include a stream mapping manager 1110. The stream mapping manager 1110 may perform an operation (i.e., a stream mapping operation or a stream clustering operation) of mapping a virtual stream managed by the host 110 to a physical stream managed by the storage device 1000. According to at least one example embodiment of the inventive concepts, the stream mapping manager 1110 may perform the above stream mapping or clustering operation based on machine learning. Below, an operation of the stream mapping manager 1110 according to at least one example embodiment of the inventive concepts will be more fully described with reference to accompanying drawings.

Figure 2:
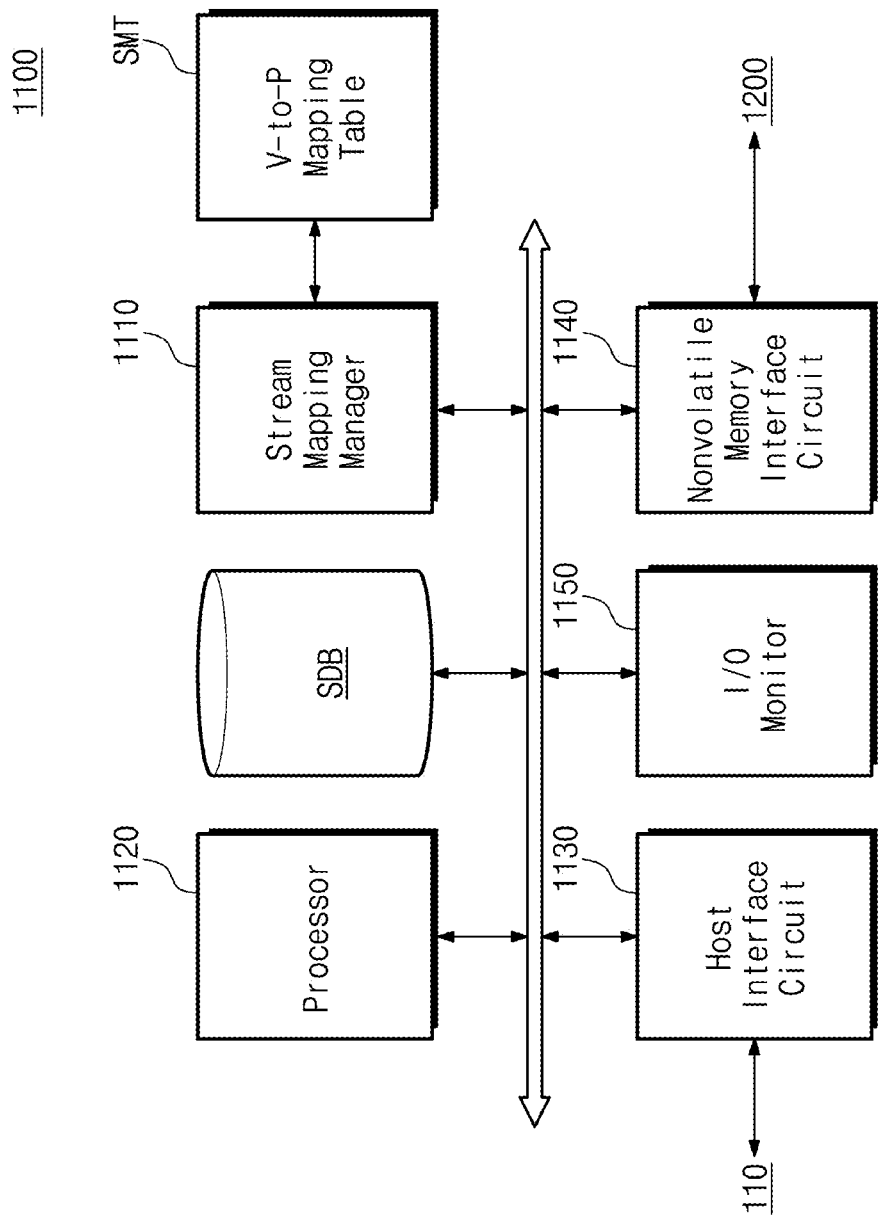
FIG. 2 is a block diagram illustrating a storage controller of FIG. 1.

FIG. 2 is a block diagram illustrating a storage controller of FIG. 1. Referring to FIGS. 1 and 2, the storage controller 1100 may include the stream mapping manager 1110, a processor 1120, a host interface circuit 1130, a nonvolatile memory interface circuit 1140, an input/output monitor 1150, stream information SDB, and a mapping table SMT (hereinafter referred to as a "stream mapping table") between a virtual stream and a physical stream.

According to at least some example embodiments of the inventive concepts, the storage controller 1100 may be, or include, processing circuitry (e.g., the processor 1120). The processing circuitry of the controller 1100 may include one or more circuits or circuitry (e.g., hardware) specifically structured to carry out and/or control some or all of the operations described in the present disclosure as being performed by the controller 1100, the storage device 1000, or an element of either. According to at least one example embodiment of the inventive concepts, the processing circuitry of the controller 1100 may include memory and one or more processors executing computer-readable code (e.g., software and/or firmware) that is stored in the memory and includes instructions for causing the one or more processors to carry out and/or control some or all of the operations described in the present disclosure as being performed by the controller 1100, the storage device 1000, or an element of either. According to at least one example embodiment of the inventive concepts, the processing circuitry of the controller 1100 may include, for example, a combination of the above-referenced hardware and one or more processors executing computer-readable code.

Returning to FIGS. 1 and 2, the stream mapping manager 1110 may be configured to assign a physical stream to the request RQ received from the host 110. For example, the stream mapping manager 1110 may determine a virtual stream identifier of the request RQ received from the host 110. The stream mapping manager 1110 may determine whether a physical stream previously assigned to the virtual stream identifier exists, based on the stream mapping table SMT. In the case where a physical stream assigned to a target virtual stream identifier does not exist, the stream mapping manager 1110 may assign or map a physical stream to the virtual stream identifier based on information about each of a plurality of physical streams in the stream information SDB and information corresponding to the received request RQ.

In this case, the stream mapping manager 1110 may map virtual streams of similar features to the same physical stream. According to at least one example embodiment of the inventive concepts, the assignment of a physical stream to a target virtual stream identifier may be performed based on the machine learning. Below, an operation of the stream mapping manager 1110 will be more fully described with reference to accompanying drawings.

The processor 1120 may control overall operations of the storage controller 1100. For example, the processor 1120 may be configured to drive a flash translation layer (FTL) (not illustrated) on the storage controller 1100. Alternatively, the processor 1120 may be configured to perform various operations necessary for the storage controller 1100 to operate.

According to at least one example embodiment of the inventive concepts, the stream mapping manager 1110 may be implemented in the form of software, hardware, or a combination thereof. For example, the stream mapping manager 1110 may be implemented by a hardware device such as a machine learning accelerator that includes circuitry configured to perform various machine learning operations. Alternatively, the stream mapping manager 1110 may be implemented in the form of software designed to perform various machine learning operations; in this case, the stream mapping manager 1110 may be driven by the processor 1120.

The host interface circuit 1130 may communicate with the host 110 in compliance with a given communication protocol. The host interface circuit 1130 may be implemented based on the given communication protocol. According to at least one example embodiment of the inventive concepts, the given interface protocol may include at least one of various interfaces such as a SATA (Serial ATA) interface, a PCIe (Peripheral Component Interconnect Express) interface, a SAS (Serial Attached SCSI) interface, an NVMe (Nonvolatile Memory express) interface, NVMeoF (NVMe of Fabrics), and an UFS (Universal Flash Storage) interface.

According to at least one example embodiment of the inventive concepts, the storage controller 1100 may determine the virtual stream identifier VSID corresponding to the request RQ provided from the host 110, by using the host interface circuit 1130. For example, in the case where the virtual stream identifier VSID of data is directly managed by the host 110, the host 110 may provide the storage controller 1100 with the request RQ in which the virtual stream identifier VSID is included. In this case, the storage controller 1100 may check the virtual stream identifier VSID of the received request RQ, by using the host interface circuit 1130. Alternatively, in the case where the virtual stream identifier VSID of data is not directly managed by the host 110, the host 110 may provide the storage controller 1100 with the request RQ in which the virtual stream identifier VSID is not included. In this case, the storage controller 1100 may check a variety of information (e.g., a logical address of data and a size of the data) of the received request RQ by using the host interface circuit 1130 and may assign and manage the virtual stream identifier VSID corresponding to the received request RQ based on the checked information. That is, the virtual stream identifier VSID may be explicitly provided by the host 110; alternatively, in the case where the virtual stream identifier VSID is not explicitly provided by the host 110, the storage controller 1100 may assign and manage the virtual stream identifier VSID based on a variety of information about the received request RQ.

An embodiment is described as the above operation of checking, allocating, or managing the virtual stream identifier VSID is performed by the host interface circuit 1130, but at least some example embodiments of the inventive concepts are not limited thereto. For example, the storage controller 1100 may further include another component for managing the virtual stream identifier VSID, for example, a command processing component such as a command parser.

The nonvolatile memory interface circuit 1140 may communicate with the nonvolatile memory device 1200 in compliance with a given communication protocol. According to at least one example embodiment of the inventive concepts, the given interface protocol may be a NAND interface.

The input/output monitor 1150 may be configured to monitor a variety of input/output information of the storage device 1000. For example, the input/output monitor 1150 may be configured to monitor a variety of input/output information about each of a plurality of virtual streams. The monitored information may be stored in the stream information SDB. According to at least one example embodiment of the inventive concepts, the input/output information about each of the plurality of virtual streams may include any or all of the following information: throughput, a logical address range, sequentiality, burstness, continuity, updateness, etc. about each of a plurality of virtual streams. According to at least one example embodiment of the inventive concepts, the throughput may indicate amount of data output from a corresponding virtual stream per a unit time, the logical address range may indicate a logical address range of data in a corresponding virtual stream, the sequentiality may indicate whether I/O requests for a corresponding virtual stream is occurred in sequence, the burstness may indicate amount of data output from a corresponding to at once, the continuity may indicate a time when data in a corresponding virtual stream is remained, and the updateness may indicate the number of updates on data in a corresponding virtual stream. However, the above descriptions are examples, and at least some example embodiments of the inventive concepts are not limited thereto.

The stream information SDB may be configured to store a variety of information corresponding to each of a plurality of virtual streams. For example, as described above, a plurality of virtual streams may be mapped to a plurality of physical streams. The stream information SDB may be configured to store information about respective virtual streams corresponding to each physical stream. According to at least one example embodiment of the inventive concepts, the stream information SDB may be updated by the input/output monitor 1150. According to at least one example embodiment of the inventive concepts, the stream information SDB may be provided in the form of a database, and may be stored in a buffer memory (not illustrated) included in the storage controller 1100 or in a buffer memory (not illustrated) outside the storage controller 1100.

The stream mapping table SMT may be configured to store information about mapping between a plurality of virtual streams and a plurality of physical streams. According to at least one example embodiment of the inventive concepts, the stream information SDB and the stream mapping table SMT may be stored in the buffer memory (not illustrated) included in the storage controller 1100 or in the buffer memory (not illustrated) outside the storage controller 1100.

Figure 3:
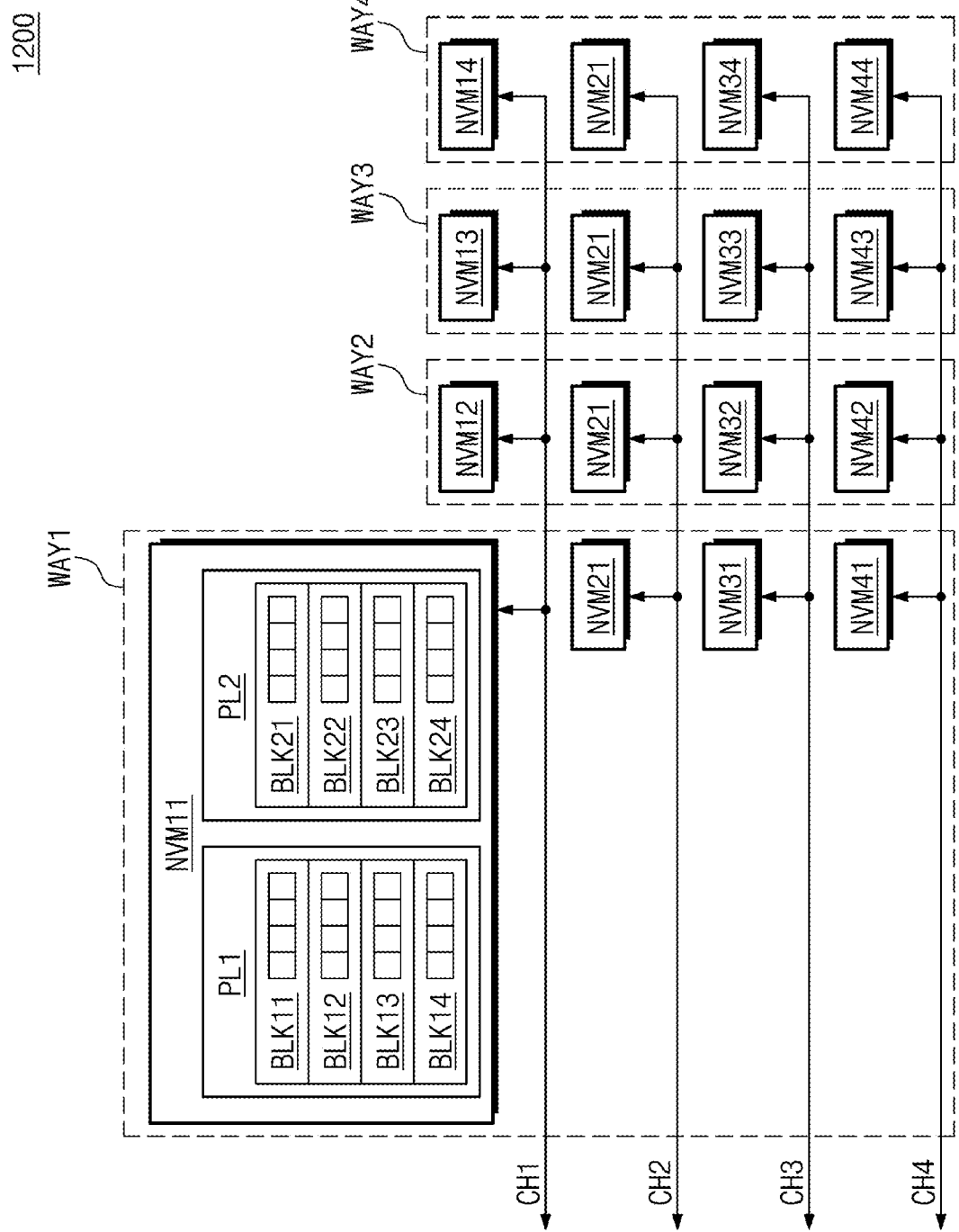
FIG. 3 is a block diagram illustrating a nonvolatile memory device of FIG. 1.
Figures 4, 5:
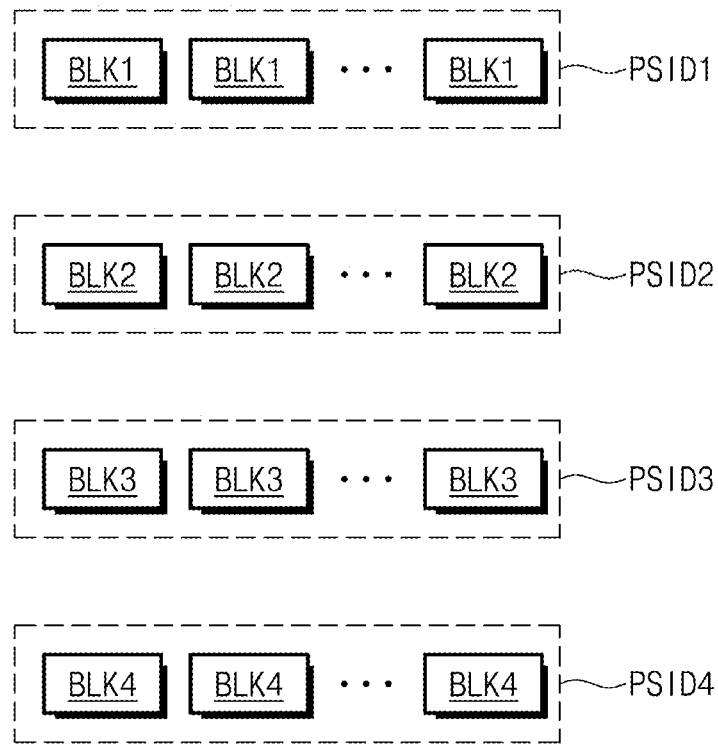
FIG. 4 is a diagram for describing a physical stream managed at a storage device.
FIG. 5 is a diagram illustrating a stream mapping table of FIG. 2.

FIG. 3 is a block diagram illustrating a nonvolatile memory device of FIG. 1. FIG. 4 is a diagram for describing a physical stream managed at a storage device. Referring to FIGS. 1, 3, and 4, the nonvolatile memory device 1200 may include a plurality of nonvolatile memories NVM11 to NVM44. Each of the plurality of nonvolatile memories NVM11 to NVM44 may be implemented with, for example, one semiconductor chip, one semiconductor die, or one semiconductor package.

The nonvolatile memory NVM11 may include a plurality of planes PL1 and PL2. The plane PL1 may include a plurality of memory blocks BLK11 to BLK14, and the plane PL2 may include a plurality of memory blocks BLK21 to BLK24. Each of the plurality of memory blocks BLK11 to BLK14 and BLK21 to BLK24 may include a plurality of pages. According to at least one example embodiment of the inventive concepts, a plurality of memory blocks (e.g., BLK11 to BLK14) included in the same plane (e.g., PL1) may be configured to share the same bit lines, but at least some example embodiments of the inventive concepts are not limited thereto. For brevity of illustration, an example is illustrated as one nonvolatile memory NVM11 includes two planes PL1 and PL2 and one plane includes four memory blocks, but at least some example embodiments of the inventive concepts are not limited thereto. For example, the number of planes, the number of memory blocks, or the number of pages may be variously changed or modified. According to at least one example embodiment of the inventive concepts, the remaining nonvolatile memories NVM12 to NVM44 are similar in structure to the nonvolatile memory NVM11 described above, and thus, additional description will be omitted to avoid redundancy.

The nonvolatile memories NVM11, NVM12, NVM13, and NVM14 belonging to a first part from among the plurality of nonvolatile memories NVM11 to NVM44 may communicate with the storage controller 1100 through a first channel CH1, the nonvolatile memories NVM21, NVM22, NVM23, and NVM24 belonging to a second part from among the plurality of nonvolatile memories NVM11 to NVM44 may communicate with the storage controller 1100 through a second channel CH2, the nonvolatile memories NVM31, NVM32, NVM33, and NVM3 belonging to a third part from among the plurality of nonvolatile memories NVM11 to NVM44 may communicate with the storage controller 1100 through a third channel CH3, and the nonvolatile memories NVM41, NVM42, NVM43, and NVM44 belonging to a fourth part from among the plurality of nonvolatile memories NVM11 to NVM44 may communicate with the storage controller 1100 through a fourth channel CH4. The nonvolatile memories NVM11, NVM21, NVM31, and NVM41 may constitute a first way WAY1, the nonvolatile memories NVM12, NVM22, NVM32, and NVM42 may constitute a second way WAY2, the nonvolatile memories NVM13, NVM23, NVM33, and NVM3 may constitute a third way WAY3, and the nonvolatile memories NVM14, NVM24, NVM34, and NVM44 may constitute a fourth way WAY4. That is, the nonvolatile memory device 1200 may have a multi-way/multi-channel structure, and it may be understood that at least some example embodiments of the inventive concepts are not limited to the structure illustrated in FIG. 3.

According to at least one example embodiment of the inventive concepts, the storage device 1000 may manage a plurality of memory blocks included in the nonvolatile memory device 1200 based on a plurality of physical streams. For example, as illustrated in FIG. 4, the storage device 1000 may manage the first memory blocks BLK1 of a plurality of memory blocks as a physical stream corresponding to a first physical stream identifier PSID1, may manage the second memory blocks BLK2 thereof as a physical stream corresponding to a second physical stream identifier PSID2, may manage the third memory blocks BLK3 thereof as a physical stream corresponding to a third physical stream identifier PSID3, and may manage the fourth memory blocks BLK4 thereof as a physical stream corresponding to a fourth physical stream identifier PSID4.

According to at least one example embodiment of the inventive concepts, memory blocks (e.g., the first memory blocks BLK1) corresponding/belonging to the same physical stream identifier may be included in the same plane, may be included in the same nonvolatile memory, may be included in nonvolatile memories connected with the same channel, or may be included in nonvolatile memories included in the same way. Alternatively, memory blocks (e.g., the first memory blocks BLK1) corresponding to a physical stream identifier (e.g., PSID1) may be distributed into a plurality of nonvolatile memories. However, the above descriptions are examples, and at least some example embodiments of the inventive concepts are not limited thereto.

As described with reference to FIG. 2, the stream mapping manager 1110 may map virtual streams of similar features to the same physical stream, and thus, data corresponding to the virtual streams of the similar features may be stored in the same physical stream. In this case, because the data stored in the same physical stream have similar features, the reduction of performance due to a maintenance operation (e.g., a garbage collection operation) of the storage device 1000 may be slowed down, or a write amplification factor (WAF) may decrease.

FIG. 5 is a diagram illustrating a stream mapping table of FIG. 2. Below, for brevity of illustration and for convenience of description, the terms "physical stream" and "physical stream identifier" are interchangeably used. That is, the term "physical stream identifier" or a reference numeral (e.g., PSID) of a physical stream identifier may be used to indicate a physical stream. Likewise, the terms "virtual stream" and "virtual stream identifier" may be interchangeably used, and the term "virtual stream identifier" or a reference numeral (e.g., VSID) of a virtual stream identifier may be used to indicate a virtual stream.

Referring to FIGS. 2 and 5, the stream mapping table SMT may include information about mapping between virtual streams and each of a plurality of physical streams. For example, the storage device 1000 may include four physical streams PSID1 to PSID4. In this case, by the storage device 1000 (or the stream mapping manager 1110), a plurality of virtual streams VSID11 to VSID1$m$ may be mapped to the first physical stream PSID1, a plurality of virtual streams VSID21 to VSID2$n$ may be mapped on the second physical stream PSID2, a plurality of virtual streams VSID31 to VSID3$k$ may be mapped to the third physical stream PSID3, and a plurality of virtual streams VSID41 to VSID4$i$ may be mapped to the fourth physical stream PSID4. The stream mapping table SMT may include mapping information as described above.

As described above, the stream mapping manager 1110 may determine whether a virtual stream corresponding to the request RQ received from the host 110 is mapped to any physical stream, based on the stream mapping table SMT. When the virtual stream corresponding to the request RQ received from the host 110 is present in the stream mapping table SMT, the stream mapping manager 1110 may process an operation corresponding to the request RQ, at a physical stream corresponding to the virtual stream. In contrast, when the virtual stream is absent from the stream mapping table SMT, the stream mapping manager 1110 may perform an operation (i.e., a stream mapping operation or a stream clustering operation) for assigning or mapping a physical stream to the virtual stream. Below, the stream mapping operation or the stream clustering operation will be more fully described with reference to accompanying drawings.

Figure 6:
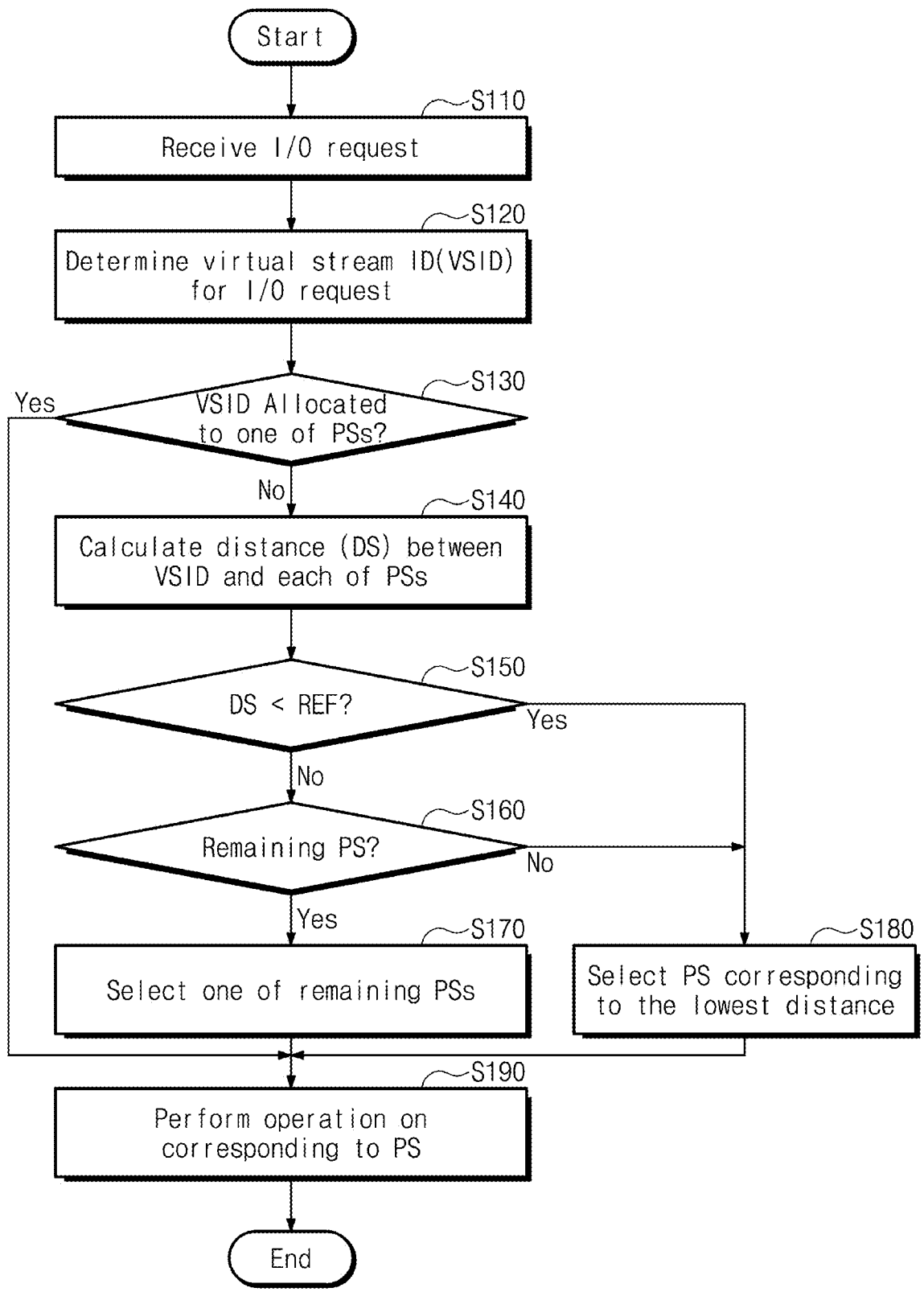
FIG. 6 is a flowchart illustrating an operation of a storage device of FIG. 2.
Figure 7:
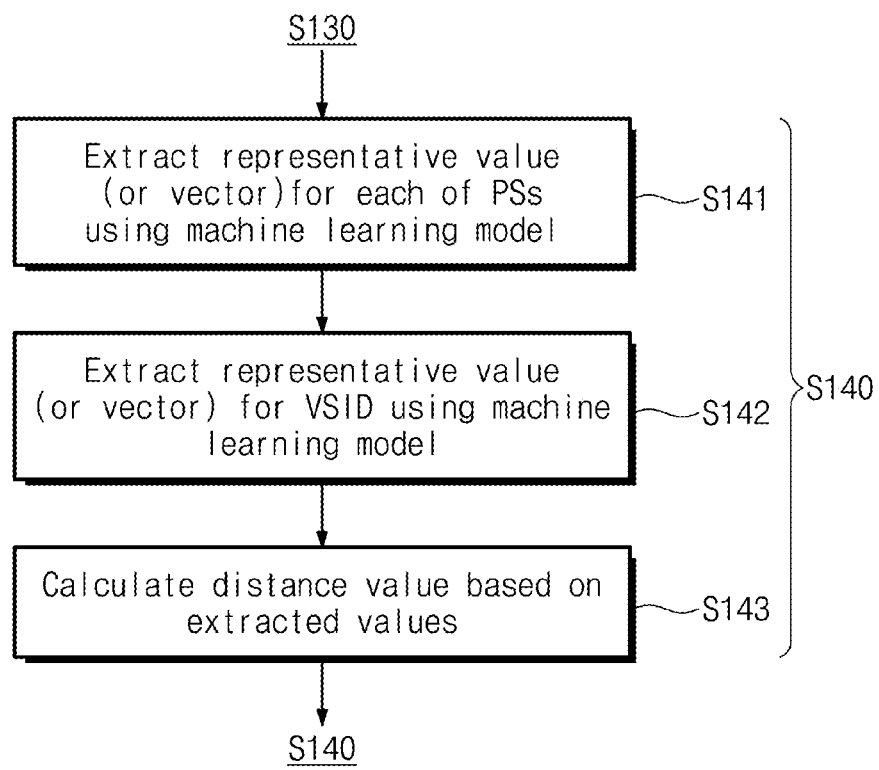
FIG. 7 is a flowchart illustrating operation S140 of FIG. 6.

FIG. 6 is a flowchart illustrating an operation of a storage device of FIG. 2. FIG. 7 is a flowchart illustrating operation S140 of FIG. 6. Referring to FIGS. 2, 6, and 7, in operation S110, the storage device 1000 may receive an input/output request RQ from the host 110. For ease of description, it is assumed that the input/output request RQ is a write request.

In operation S120, the storage device 1000 may determine the virtual stream identifier VSID corresponding to the input/output request RQ. For example, as described with reference to FIG. 2, in the case where the virtual stream identifier VSID is directly managed by the host 110, information about the virtual stream identifier VSID may be included in the input/output request RQ. In this case, the storage controller 1100 may determine the virtual stream identifier VSID corresponding to the input/output request RQ, based on the input/output request RQ. In contrast, in the case where the virtual stream identifier VSID is not directly managed by the host 110, the storage controller 1100 may assign and manage the virtual stream identifier VSID to the input/output request RQ based on a variety of information (e.g., a logical address and a data size) about the input/output request RQ. For convenience of description, a virtual stream identifier corresponding to the input/output request RQ from the host 110 is called a "0-th virtual stream identifier", and a virtual stream corresponding to the 0-th virtual stream identifier is called a "0-th virtual stream".

In operation S130, the storage device 1000 may determine whether a 0-th virtual stream identifier VSID0 is assigned or mapped to a physical stream. For example, the storage controller 1100 of the storage device 1000 may determine whether the 0-th virtual stream identifier VSID0 is assigned to a physical stream, based on the stream mapping table SMT. When it is determined that the 0-th virtual stream identifier VSID0 is assigned to the physical stream, in operation S190, the storage device 1000 may perform an operation corresponding to the input/output request RQ, at the corresponding physical stream PS. For example, the storage controller 1100 of the storage device 1000 may store data corresponding to the input/output request RQ in the corresponding physical stream PS or one of memory blocks included in the corresponding physical stream PS.

When it is determined that a physical stream assigned to the 0-th virtual stream identifier VSID0 does not exist, in operation S140, the storage controller 1100 of the storage device 1000 may calculate distance information DS between each of a plurality of physical streams PS and the 0-th virtual stream. According to at least one example embodiment of the inventive concepts, the distance information DS may be a value indicating similarity (or stream similarity) between the 0-th virtual stream and each of the plurality of physical streams PS. The stream similarity may be a factor indicating how much features of virtual streams included in each of a plurality of physical streams and a feature of the 0-th virtual stream are similar. According to at least one example embodiment of the inventive concepts, an operation of calculating the distance information DS may be performed based on the machine learning.

In detail, operation S140 may include operation S141 to operation S143 as illustrated in FIG. 7. In operation S141, the storage device 1000 may extract a representative value (or a representative vector) for each physical stream by using a machine learning model. For example, a representative value of each of the plurality of physical streams may be a feature value corresponding to one of virtual streams assigned to each of the plurality of physical streams. A feature value may be one of a variety of information of the corresponding virtual stream, such as throughput, a logical address range, sequentiality, burstness, continuity, updateness, etc., or may be a combination of two or more thereof. According to at least one example embodiment of the inventive concepts, the feature value may be a value directly monitored by the input/output monitor 1150 (refer to FIG. 2) or may be a combination of monitored values.

The storage controller 1100 of the storage device 1000 may extract a representative value for each physical stream by using the machine learning, based on information stored in the stream information SDB.

In operation S142, the storage device 1000 may extract a 0-th representative value (or a 0-th representative vector which may include, for example, multiple feature values) associated with the 0-th virtual stream identifier VSID0, by using the machine learning model. The 0-th representative value may be a feature value corresponding to the 0-th virtual stream. The feature value is described above, and thus, additional description will be omitted to avoid redundancy.

In operation S143, the storage device 1000 may calculate distance information based on the extracted values. For example, the storage controller 1100 of the storage device 1000 may calculate a logical distance between each of the extracted representative values and the 0-th representative value, may quantify the calculated distance, and may output a result of the quantification as distance information. According to at least one example embodiment of the inventive concepts, as described above, the distance information DS may indicate similarity between each of a plurality of physical streams and the 0-th virtual stream.

After operation S140, in operation S150, the storage device 1000 may determine whether the distance information DS is lower than a reference value REF. For example, the distance information DS may include a plurality of values associated with similarity between a target virtual stream and each of the plurality of physical streams PS. The storage controller 1100 of the storage device 1000 may determine whether at least one of the plurality of values is lower than the reference value REF.

When the distance information DS is not lower than the reference value REF (e.g., when none of the plurality of values included in the distance information DS, which are associated with the plurality of physical streams PS respectively, is lower than the reference value REF), in operation S160, the storage device 1000 may determine whether physical streams that are not allocated remain. When unallocated physical streams remain, in operation S170, the storage device 1000 may select one of the unallocated physical streams. For example, the storage controller 1100 of the storage device 1000 may assign or map one of the unallocated physical streams to the 0-th virtual stream.

When it is determined in operation S150 that the distance information DS is lower than the reference value REF (e.g., when at least one value from among the plurality of values in the distance information DS, which are associated with the plurality of physical streams PS respectively, is lower that the reference value REF) or when it is determined in operation S160 that an unallocated physical stream does not remain, in operation S180, the storage device 1000 may select a physical stream corresponding to the lowest value of a plurality of values included in the lowest distance information DS. For example, the distance information DS being lower than the reference value REF may mean that a physical stream having a high similarity to the 0-th virtual stream is present in the plurality of physical streams. Additionally, as the distance information DS becomes lower or becomes closer to "0", the similarity may increase. In the case where a first physical stream has high similarity to the 0-th virtual stream, similarity between the remaining virtual streams mapped to the first physical stream and the 0-th virtual stream may be high. That is, the physical stream corresponding to the lowest distance value of the plurality of values included in the distance information DS may be selected for the 0-th virtual stream. Alternatively, even though the distance information DS is not lower than the reference value REF, in the case where an unallocated physical stream does not remain, a physical stream corresponding to the lowest distance value from among allocated physical streams may be selected, and thus, a physical stream having high similarity to the 0-th virtual stream may be selected.

According to at least one example embodiment of the inventive concepts, in the case where at least two distance values are equal and are the lowest, the storage device 1000 may select a physical stream depending on a separate internal policy. For example, the storage device 1000 may select a physical stream to which relatively fewer memory blocks have been allocated, from among physical streams respectively corresponding to the at least two distance values that are the lowest and equal. Alternatively, the storage device 1000 may select a physical stream by comparing any other information about the physical streams respectively corresponding to the at least two distance values that are the lowest.

Afterwards, the storage device 1000 may perform operation S190. The operation S190 is described above, and thus, additional description will be omitted to avoid redundancy.

According to at least one example embodiment of the inventive concepts, the storage device 1000 may update the stream mapping table SMT based on information about the physical stream allocated to the 0-th virtual stream. For example, the storage device 1000 may update the stream mapping table SMT with mapping information of the 0-th virtual stream identifier and an allocated physical stream identifier.

As described above, the storage device 1000 according to at least one example embodiment of the inventive concepts may select a physical stream having the highest similarity to a virtual stream by extracting a representative value for each physical stream and comparing the extracted representative value and a representative value of a virtual stream from the host 110. Also, in determining similarity, because a representative value extracted from a variety of stream information is used and the variety of stream information is reflected periodically or in real time, the accuracy with which the similarity is determined may be improved. Accordingly, because virtual streams of high similarity are assigned or mapped to the same physical stream, the reduction of performance due to the maintenance operation of the storage device 1000 may be prevented (or slowed down).

Figure 8:
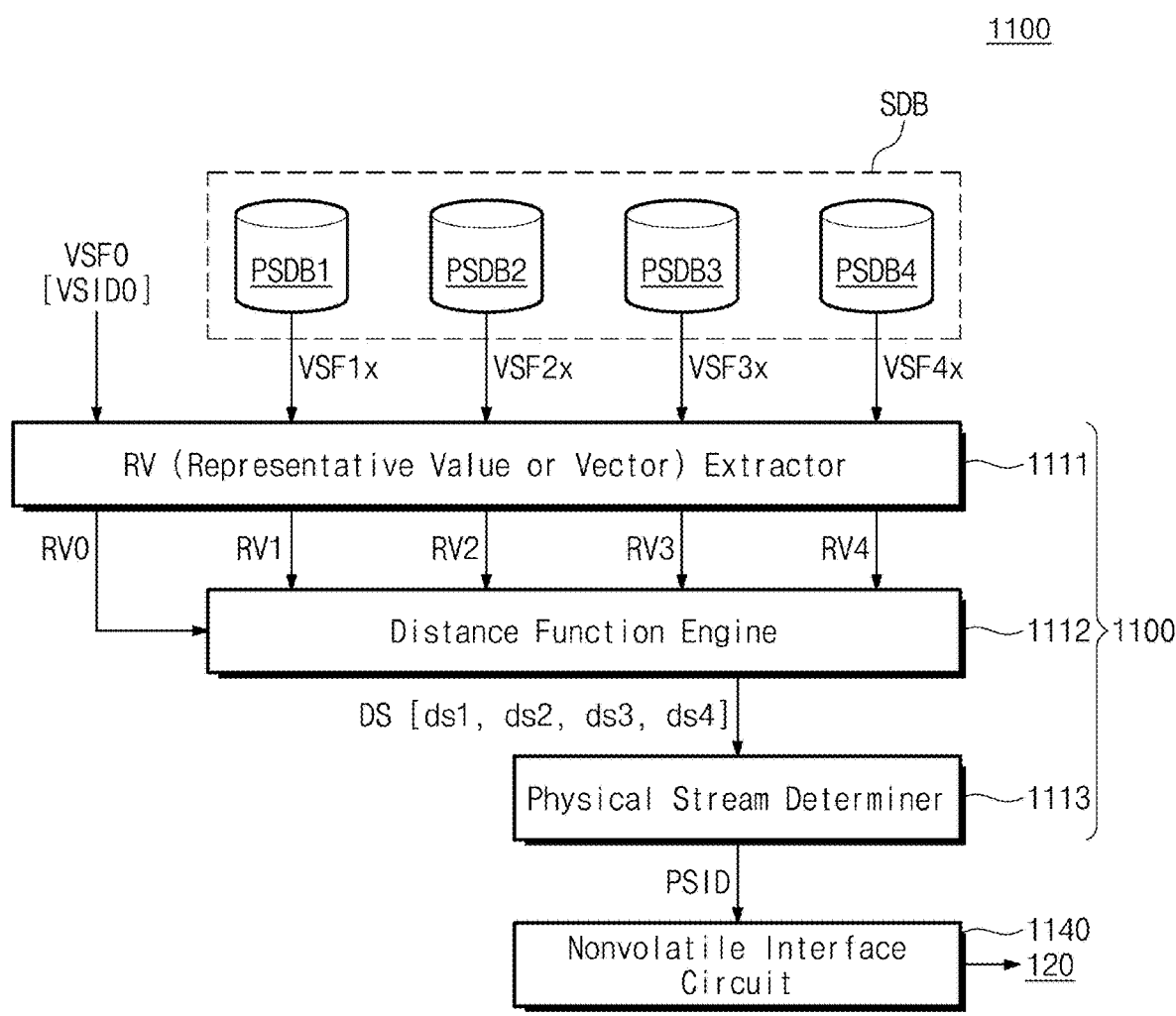
FIG. 8 is an example diagram for describing a distance information calculating process of a storage controller of FIG. 2.
Figure 9:
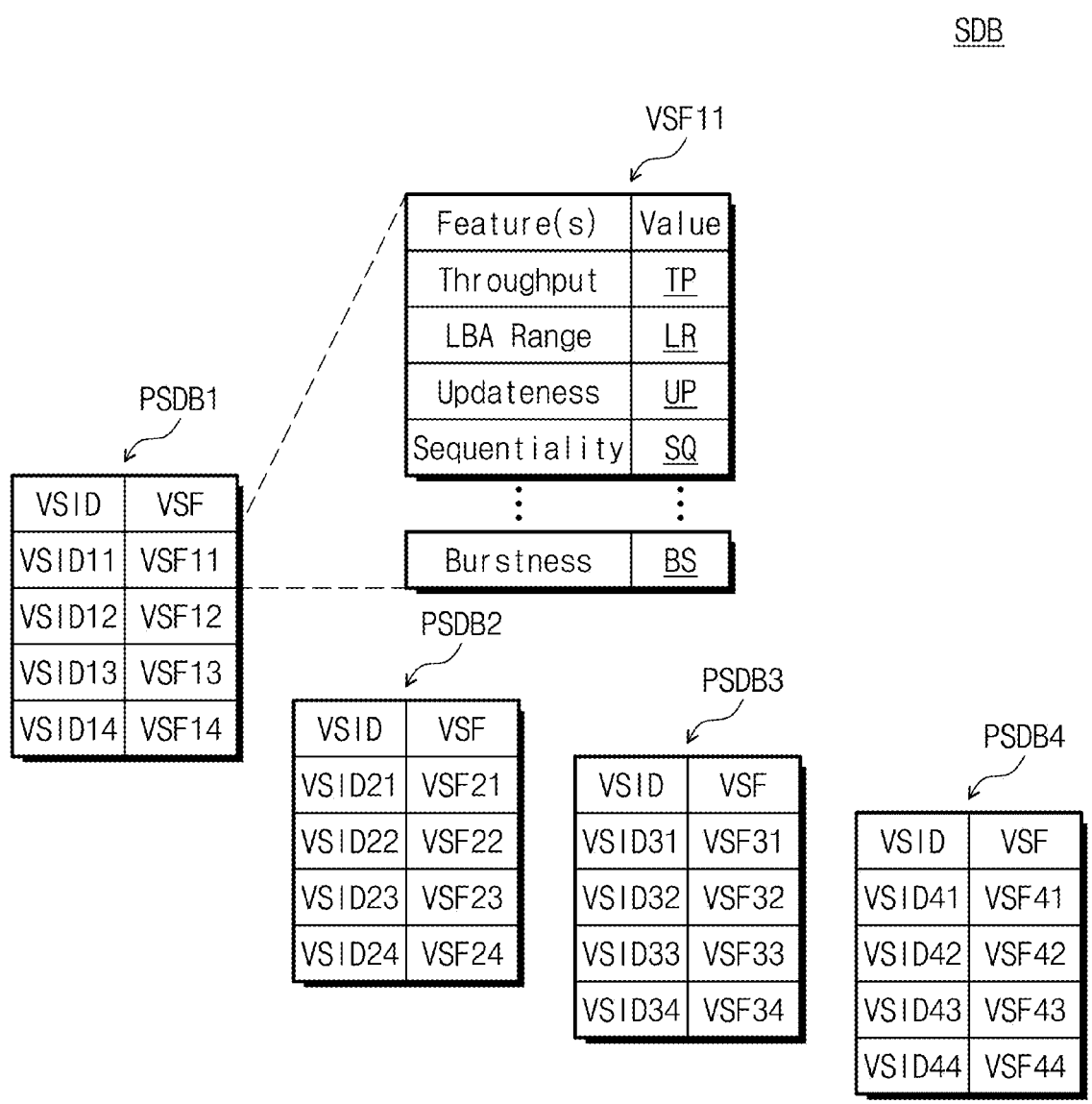
FIG. 9 is a diagram illustrating a physical stream database of FIG. 8.
Figure 10:
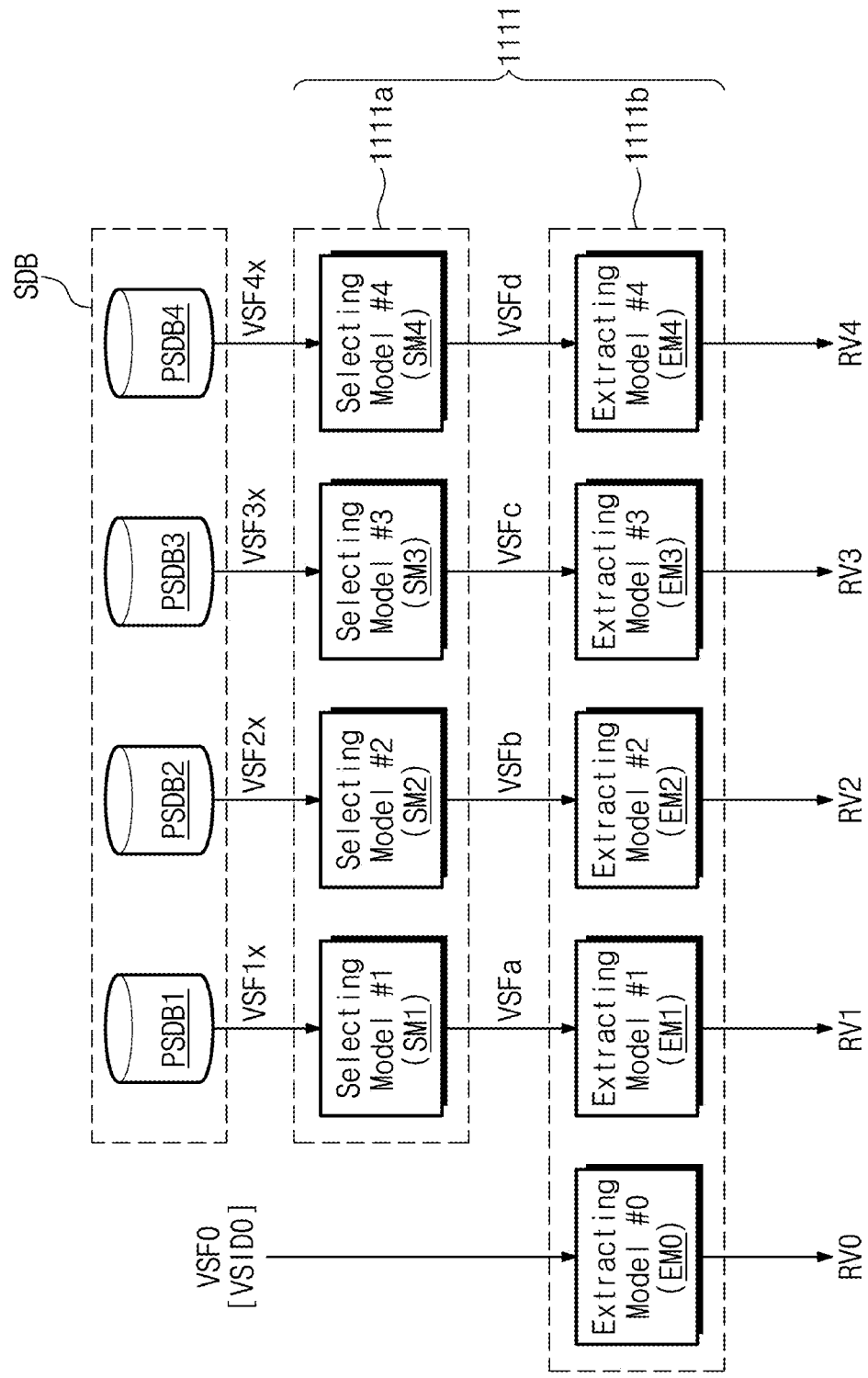
FIG. 10 is a block diagram illustrating a representative value extractor of FIG. 8 in detail.

FIG. 8 is an example diagram for describing a distance information calculating process of a storage controller of FIG. 2. FIG. 9 is a diagram illustrating a physical stream database of FIG. 8. FIG. 10 is a block diagram illustrating a representative value extractor of FIG. 8 in detail. For brevity of illustration, components that are unnecessary to describe calculation of distance information and a stream mapping operation are omitted. Also, for convenience of description, it is assumed that the storage device 1000 includes four physical streams PSID1, PSID2, PSID3, and PSID4. However, at least some example embodiments of the inventive concepts are not limited thereto. For example, the number of physical streams that are managed by the storage device 1000 may be variously changed.

Referring to FIGS. 2 and 8 to 10, the storage controller 1100 may include the stream information SDB, the stream mapping manager 1110, and the nonvolatile memory interface circuit 1140.

The stream information SDB may include information PSDB1 to PSDB4 (hereinafter referred to as "first to fourth physical stream information") about first to fourth physical streams. Each of the first to fourth physical stream information PSDB1 to PSDB4 may include features associated with corresponding virtual streams. For example, as illustrated in FIG. 9, the first physical stream information PSDB1 may include virtual stream features VSF11 to VSF14 of virtual streams VSID11 to VSID14 mapped to the first physical stream PSID1. The second physical stream information PSDB2 may include virtual stream features VSF21 to VSF24 of virtual streams VSID21 to VSID24 mapped to the second physical stream PSID2. The third physical stream information PSDB3 may include virtual stream features VSF31 to VSF34 of virtual streams VSID31 to VSID34 mapped to the third physical stream PSID3. The fourth physical stream information PSDB4 may include virtual stream features VSF41 to VSF44 of virtual streams VSID41 to VSID44 mapped to the fourth physical stream PSID4.

Each of the virtual stream features VSF11 to VSF44 may include a variety of information about each of the virtual streams VSID11 to VSID44. For example, the virtual stream feature VSF11 of the virtual stream VSID11 mapped to the first physical stream PSID1 may include the following information about the first virtual stream VSID1: throughput TP, a logical address range LR, updateness UP, sequentiality SQ, and burstness BS. The virtual stream feature VSF11 may be a value monitored by the input/output monitor 1150 (refer to FIG. 2) or may be a combination of monitored values. Each of the remaining virtual stream features VSF12 to VSF44 may include information of the corresponding virtual stream as described above, and thus, additional description will be omitted to avoid redundancy.

The stream mapping manager 1110 may determine the physical stream PSID associated with the 0-th virtual stream VSID0, based on the stream information SDB and a 0-th virtual stream feature VSF0 of the 0-th virtual stream VSID0 (i.e., a virtual stream corresponding to the request RQ from the host 110).

For example, the stream mapping manager 1110 may include a representative value extractor 1111, a distance function engine 1112, and a physical stream determiner 1113. The representative value extractor 1111 may extract 0-th to fourth representative values RV0 to RV4 from the 0-th virtual stream feature VSF0 and virtual stream features VFS1$x$ to VSF4$x$ of the first to fourth physical stream information PSDB1 to PSDB4. According to at least one example embodiment of the inventive concepts, the representative value extractor 1111 may perform the above representative value extracting operation based on a machine learning model learned in advance. According to at least one example embodiment of the inventive concepts, the machine learning model learned in advance may be learned or trained by using training data sets. The training data sets may include data patterns having various types or various characteristics and be prepared by a user or a vendor. According to at least one example embodiment of the inventive concepts, the training data sets may be data sets stored in the storage device in a run-time.

In detail, as illustrated in FIG. 10, the representative value extractor 1111 may include a selecting engine 1111$a$ and an extracting engine 1111$b$. The selecting engine 1111$a$ may include a plurality of selecting models SM1 to SM4. The selecting engine 1111$a$ may select corresponding virtual stream features VSFa to VSFd from a plurality of virtual stream features VSF1$x$ to VSF4$x$ of the first to fourth physical stream information PSDB1 to PSDB4, by using the plurality of selecting models SM1 to SM4.

According to at least one example embodiment of the inventive concepts, each of the plurality of selecting models SM1 to SM4 may be a model that is in advance learned through the machine learning. The machine learning may include one of various machine learning schemes such as a siamese network, a deep neural network, a convolution neural network, and an auto-encoder. According to at least one example embodiment of the inventive concepts, the plurality of selecting models SM1 to SM4 may be implemented with different learning models, or the plurality of selecting models SM1 to SM4 may be implemented with a single learning model. That is, the selecting engine 1111$a$ may select a virtual stream feature being high importance from among virtual stream features corresponding to each of a plurality of physical streams, by using the corresponding one of the plurality of selecting models SM1 to SM4. According to at least one example embodiment of the inventive concepts, that the importance of a virtual stream feature is high may mean that the virtual stream feature represents a feature of the corresponding physical stream or a feature of a plurality of virtual streams included in the corresponding physical stream.

The extracting engine 1111$b$ may include a plurality of extracting models EM0 to EM4. The extracting engine 1111$b$ may extract the 0-th to fourth representative values RV0 to RV4 from the 0-th virtual stream feature VSF0 and the selected virtual stream features VSFa to VSFd, by using the 0-th to fourth extracting models EM0 to EM4.

According to at least one example embodiment of the inventive concepts, each of the plurality of extracting models EM0 to EM4 may be a model that is in advance learned through the machine learning. The machine learning may include one of the machine learning schemes described above. According to at least one example embodiment of the inventive concepts, the plurality of extracting models EM0 to EM4 may be implemented with different learning models, or the plurality of extracting models EM0 to EM4 may be implemented with a single learning model. That is, the extracting engine 1111b may extract information of high importance as representative values from a plurality of virtual stream features by using the plurality of extracting models EM0 to EM4. That the importance of the representative value is high may mean that the representative value represents a feature of the corresponding physical stream. For example, in the case where virtual streams of a large amount of data are mapped or assigned to a specific physical stream, a representative value of the specific physical stream may be a feature value capable of expressing a large amount of data, such as a logical block address range or a data size. Alternatively, in the case where virtual streams of hot data are mapped or assigned to a specific physical stream, a representative value of the specific physical stream may be a feature value indicating an update period of data, such as updateness. However, the above descriptions are examples, and at least some example embodiments of the inventive concepts are not limited thereto. According to at least one example embodiment of the inventive concepts, a representative value extracted from each of a plurality of stream features may correspond to one piece of information or may correspond to at least two or more information. Alternatively, representative values extracted from a plurality of stream features may be different types of information.

Returning to FIG. 8, as described above, the representative value extractor 1111 may extract the 0-th to fourth representative values RV0 to RV4 based on the models learned in advance through the machine learning.

The distance function engine 1112 may be configured to calculate the distance information DS based on the representative values RV0 to RV4 extracted by the representative value extractor 1111. For example, as described above, the 0-th representative value RV0 may be a representative value corresponding to the 0-th virtual stream VSID0 of the request RQ received from the host 110, and the first to fourth representative values RV1 to RV4 may be representative values respectively corresponding to the first to fourth physical streams PSID1 to PSID4 managed by the storage device 1000. The distance function engine 1112 may compare the 0-th representative value RV0 with each of the first to fourth representative values RV1 to RV4 and may output a comparison result as the distance information DS. That is, the distance information DS may include first to fourth distance values ds1 to ds4. The first distance value ds1 may indicate similarity between the 0-th virtual stream VSID0 and the first physical stream PSID1, the second distance value ds2 may indicate similarity between the 0-th virtual stream VSID0 and the second physical stream PSID2, the third distance value ds3 may indicate similarity between the 0-th virtual stream VSID0 and the third physical stream PSID3, and the fourth distance value ds4 may indicate similarity between the 0-th virtual stream VSID0 and the fourth physical stream PSID4. According to at least one example embodiment of the inventive concepts, the distance function engine 1112 may be configured to calculate the above distance information DS by using a learning model learned in advance through the machine learning.

The physical stream determiner 1113 may receive the distance information DS from the distance function engine 1112 and may determine a physical stream or a physical stream identifier PSID corresponding to the 0-th virtual stream VSID0 based on the received distance information DS. For example, the physical stream determiner 1113 may determine whether a value lower than the reference value REF is present in the first to fourth distance values ds1 to ds4 included in the distance information DS. Alternatively, when a value lower than the reference value REF is absent from the first to fourth distance values ds1 to ds4 and any other physical streams exists, the physical stream determiner 1113 may select any other physical stream except for the first to fourth physical streams PSID1 to PSID4 as a physical stream corresponding to the 0-th virtual stream VSID0.

Alternatively, when a value lower than the reference value REF is absent from the first to fourth distance values ds1 to ds4 and any other physical streams do not exist, the physical stream determiner 1113 may select a physical stream corresponding to the lowest value of the first to fourth physical streams ds1 to ds4 as a physical stream corresponding to the 0-th virtual stream VSID0. Alternatively, when a value lower than the reference value REF is present in the first to fourth distance values ds1 to ds4, the physical stream determiner 1113 may select a physical stream corresponding to the lowest value of the first to fourth physical streams ds1 to ds4 as a physical stream corresponding to the 0-th virtual stream VSID0.

For example, it is assumed that [ds1, ds2, ds3, ds4] is [0.52, 0.83, 0.15, 0.41]. Under this assumption, in the case where the reference value REF is "0.2", because the distance value ds3 is lower than the reference value REF, the third physical stream PSID3 corresponding to the third distance value ds3 being the lowest may be selected as a physical stream corresponding to the 0-th virtual stream VSID0. In the case where the reference value REF is "0.1" and an unallocated physical stream (e.g., a fifth physical stream (not illustrated)) exists, the unallocated physical stream may be selected as a physical stream corresponding to the 0-th virtual stream VSID0. In the case where the reference value REF is "0.1" and an unallocated physical stream (e.g., a fifth physical stream (not illustrated)) does not exist, the third physical stream PSID3 corresponding to the third distance value ds3 being the lowest may be selected as a physical stream corresponding to the 0-th virtual stream VSID0.

The physical stream identifier PSID corresponding to the selected physical stream may be provided to the nonvolatile memory interface circuit 1140, and the nonvolatile memory interface circuit 1140 may perform an operation associated with the selected physical stream identifier PSID (i.e., an operation corresponding to the request RQ). According to at least one example embodiment of the inventive concepts, the physical stream identifier PSID corresponding to the selected physical stream may be provided to the flash translation layer (FTL) (not illustrated), and the flash translation layer (FTL) may select or assign a memory block, in which the operation corresponding to the request RQ is to be performed, from among a plurality of memory blocks included in the nonvolatile memory device 1200 based on the selected physical stream identifier PSID. For example, in the case where the third physical stream PSID3 is selected, as described with reference to FIG. 4, at least one of the third memory blocks BLK3 corresponding to the third physical stream PSID3 may be selected as a memory block in which the operation corresponding to the request RQ is to be performed.

Figure 11A:
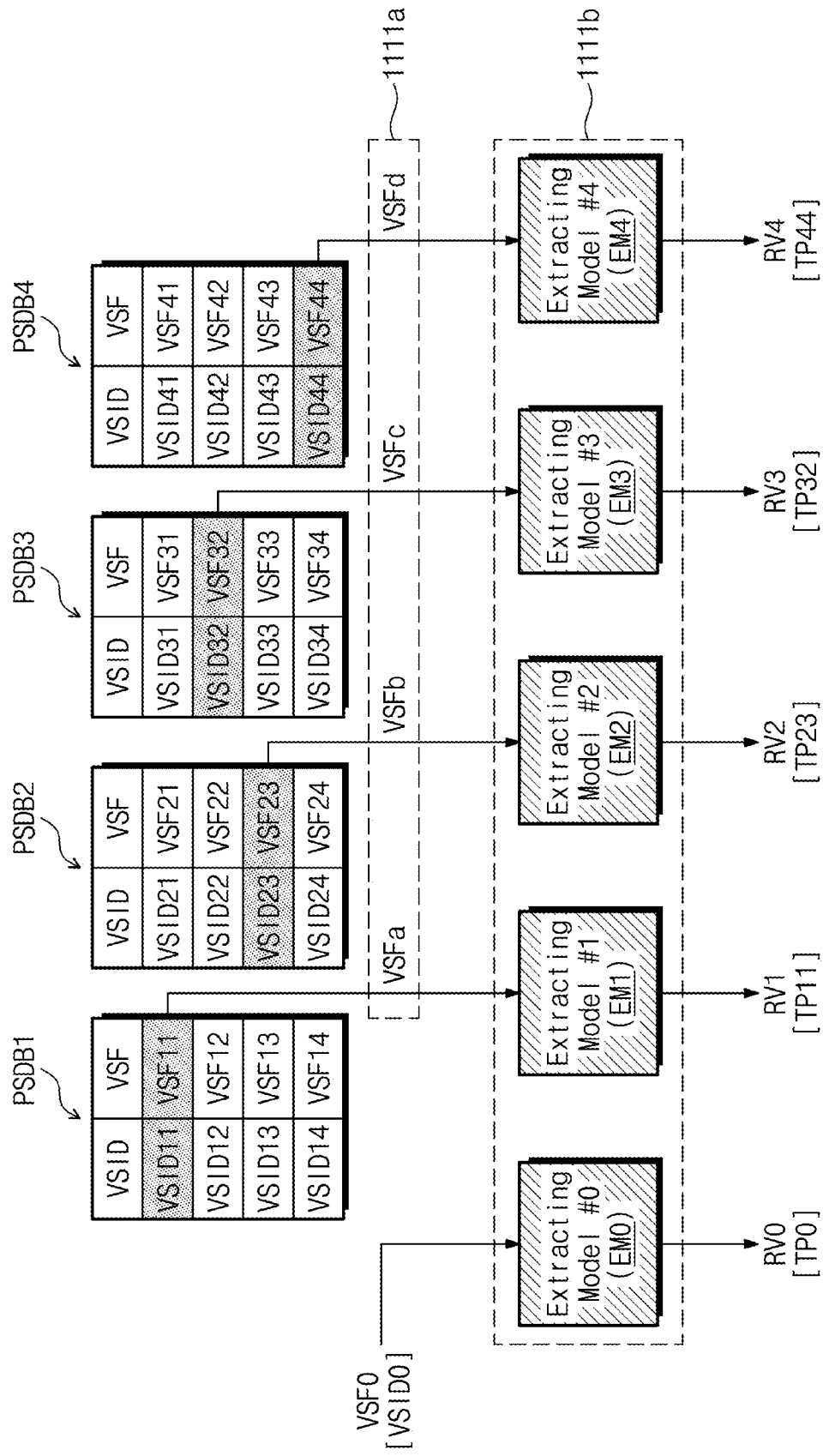
FIGS. 11A and 11B are diagrams for describing an operation of a representative value extractor of FIGS. 8 and 9.
Figure 11B:
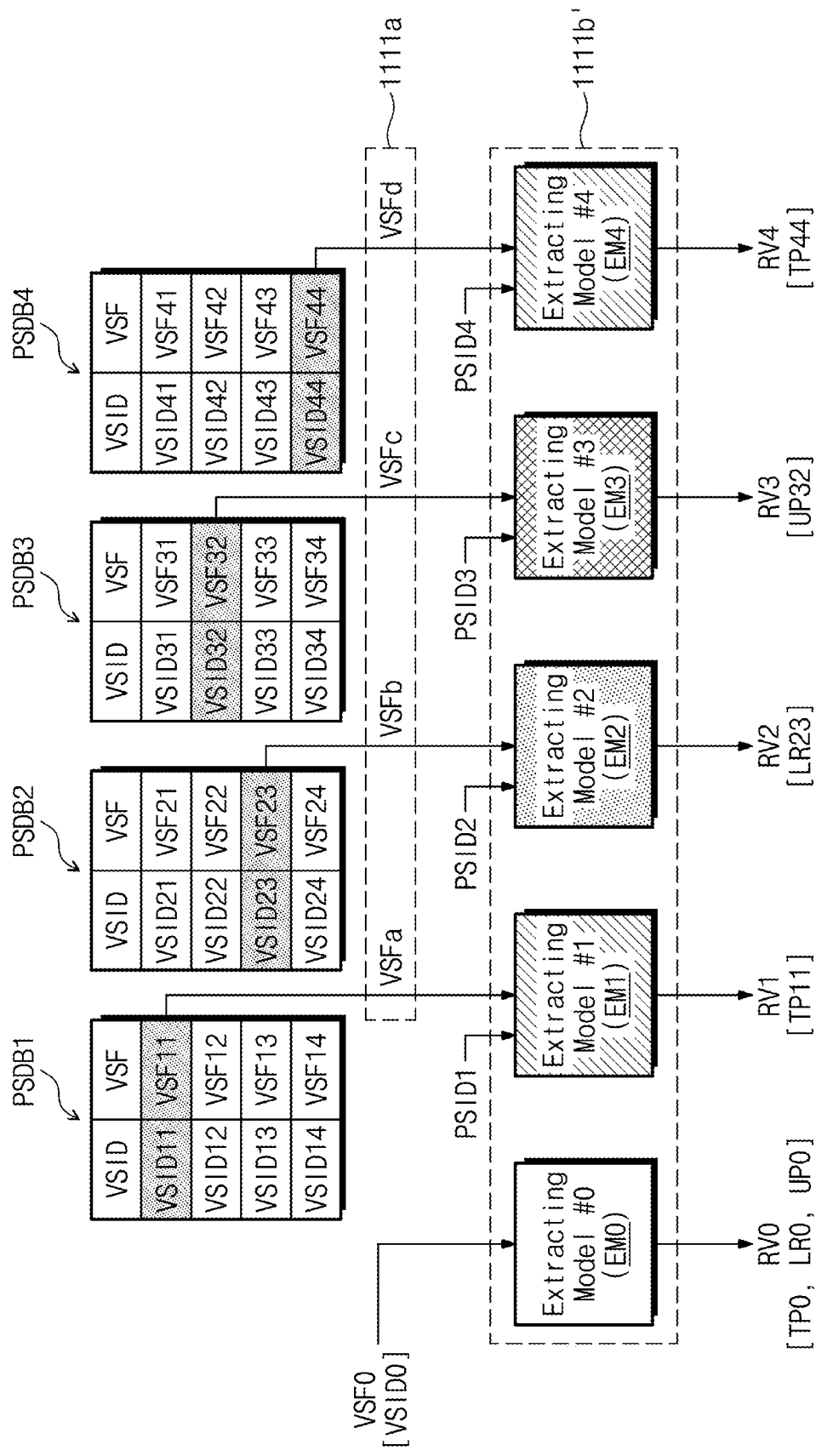

FIGS. 11A and 11B are diagrams for describing an operation of a representative value extractor of FIGS. 8 and 9. For brevity of illustration and for convenience of description, a configuration of the selecting models SM1 to SM4 is omitted in FIGS. 11A and 11B.

Referring to FIGS. 8, 11A, and 11B, as described above, the selecting engine 1111a may select the virtual stream features VSFa to VSFd based on the first to fourth physical stream information PSDB1 to PSDB4. For example, the selecting engine 1111a may select the virtual stream feature VSF11 corresponding to the virtual stream VSID11 of the virtual streams VSID11 to VSID14 mapped to the first physical stream PSID1 as the virtual stream feature VSFa corresponding to the first physical stream PSID1, based on the first physical stream information PSDB1. Likewise, the selecting engine 1111a may select the virtual stream features VSF23, VSF32, and VSF44 corresponding to the virtual streams VSID23, VSID32, and VSID44 of the virtual streams VSID21 to VSID44 mapped to the second to fourth physical streams PSID2 to PSID4 as the virtual stream features VSFb, VSFc, and VSFd corresponding to the second to fourth physical streams PSID2 to PSID4, based on the second to fourth physical stream information PSDB2 to PSDB4. The selecting engine 1111a may perform the above selecting operation based on the selecting models SM1 to SM4 (refer to FIG. 10) learned in advance through the machine learning.

The extracting engine 1111b may extract the 0-th to fourth representative values RV0 to RV4 based on the 0-th virtual stream feature VSF0 and the virtual stream features VSFa to VSFd selected by the selecting engine 1111a. In this case, the 0-th to fourth representative values RV0 to RV4 may include information of the same type or may include information of different types.

For example, as illustrated in FIG. 11A, the extracting engine 1111b may respectively extract the 0-th to fourth representative values RV0 to RV4 from the 0-th virtual stream feature VSF0 and the selected virtual stream features VSFa to VSFd, by using the plurality of extracting models EM0 to EM4. In this case, the 0-th to fourth representative values RV0 to RV4 may include information TP0, TP11, TP23, TP32, and TP44 about throughput associated with the corresponding virtual streams. That is, the 0-th to fourth representative values RV0 to RV4 extracted by the extracting engine 1111b may include information of the same type. In this case, the plurality of extracting models EM0 to EM4 included in the extracting engine 1111b may be implemented with a single model that is in advance learned through the machine learning. That is, the extracting engine 1111b may extract the 0-th to fourth representative values RV0 to RV4 by using a single model.

In contrast, as illustrated in FIG. 11B, the representative values RV0 to RV4 extracted from an extracting engine 1111b' may include information of different types. For example, the first representative value RV1 corresponding to the first physical stream PSID1 may include information about throughput TP11 of the virtual stream VSID11 of the first physical stream PSID1, the second representative value RV2 corresponding to the second physical stream PSID2 may include information about a logical block address range LR23 of the virtual stream VSID23 of the second physical stream PSID2, the third representative value RV3 corresponding to the third physical stream PSID3 may include information about updateness UP32 of the virtual stream VSID32 of the third physical stream PSID3, and the fourth representative value RV4 corresponding to the fourth physical stream PSID4 may include information about throughput TP44 of the virtual stream VSID44 of the fourth physical stream PSID4. In this case, the 0-th representative value RV0 corresponding to the 0-th virtual stream VSID0 may include information about throughput TP0, a logical block address range LR0, and updateness UP0, for comparison with the remaining representative values RV1 to RV4. In this case, the first and fourth extracting models EM1 and EM4 may be implemented with the same single learning model, and the remaining extracting models EM0, EM2, and EM3 may be implemented with different learning models.

According to at least one example embodiment of the inventive concepts, each of the extracting models EM1 to EM4 configured to extract the first to fourth representative values RV1 to RV4 respectively corresponding to the first to fourth physical streams PSID1 to PSID4 may receive information about the corresponding physical stream (e.g., the corresponding one of the physical stream identifiers PSID1 to PSID4) as an input. That is, the extracting models EM1 to EM4 may extract the first to fourth representative values RV1 to RV4 based on the corresponding physical stream identifiers PSID1 to PSID4 and the corresponding virtual stream features VSFa to VSFd.

The embodiments are described above as the representative value extractor 1111 selects one virtual stream feature for each physical stream and extracts one piece of information from the selected virtual stream feature, but at least some example embodiments of the inventive concepts are not limited thereto. For example, the selecting engine 1111a of the representative value extractor 1111 may select at least two or more virtual stream features for each physical stream. Alternatively, the extracting engine 1111b of the representative value extractor 1111 may be configured to calculate a new type of information by combining, reprocessing, or recalculating at least two or more types of information of a variety of information of a selected virtual stream feature. The new type of information may be determined by the machine learning of the extracting engine 1111b.

Figure 12:
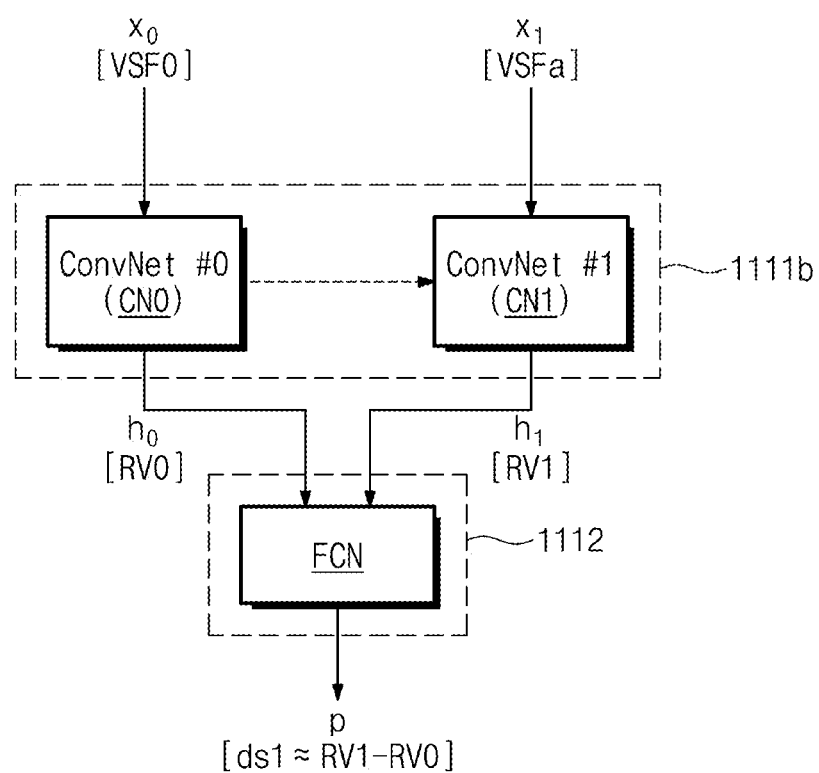
FIG. 12 is an example diagram for describing a distance function engine of FIG. 8.

FIG. 12 is an example diagram for describing a distance function engine of FIG. 8. For convenience of description and for brevity of illustration, a configuration to calculate one piece of distance information of a plurality of distance information included in the distance information DS is schematically illustrated in FIG. 12. However, at least some example embodiments of the inventive concepts are not limited thereto. For example, it may be understood that a distance function engine may be expanded or modified based on the configuration illustrated in FIG. 12.

Referring to FIGS. 8 and 12, the extracting engine 1111b may include 0-th and first convolution layers CN0 and CN1. According to at least one example embodiment of the inventive concepts, the 0-th convolution layer CN0 may indicate the 0-th extracting model EM0, and the first convolution layer CN1 may indicate the first extracting model EM1. The 0-th convolution layer CN0 may receive a value of "$x_0$" and may extract or output a value of "$h_0$". The first convolution layer CN1 may receive a value of "$x_1$" and may extract or output a value of "$h_1$". According to at least one example embodiment of the inventive concepts, the value of "$x_0$" may indicate the 0-th virtual stream feature VSF0, and the value of "$h_0$" may indicate the 0-th representative value RV0. The value of "$x_1$" may indicate the virtual stream feature VSFa corresponding to the first physical stream PSID1, and the value of "$h_1$" may indicate the first representative value RV1. According to at least one example embodiment of the inventive concepts, each of "$x_0$", "$x_1$", "$h_0$", and "$h_1$" may be a vector value including corresponding information.

According to at least one example embodiment of the inventive concepts, the 0-th and first convolution layers CN0 and CN1 may be configured to share learned parameters, for symmetry of similarity calculation (i.e., to extract information of the same type). According to at least one example embodiment of the inventive concepts, the 0-th and first convolution layers CN0 and CN1 may be implemented based on different learning models for feature extraction or different feature extraction techniques.

The distance function engine 1112 may include a jointed fully-connected net layer FCN. The jointed fully-connected net layer FCN may receive the value of "$h_0$" from the 0-th convolution layer CN0 and may receive the value of "$h_1$" from the first convolution layer CN1. The jointed fully-connected net layer FCN may output or calculate a value of "p", based on the input values "$h_0$" and "$h_1$". According to at least one example embodiment of the inventive concepts, the value of "p" may be the first distance ds1, and the first distance value ds1 may be expressed by a value corresponding to a difference between RV1 and RV0. That is, the value of "p" may be calculated by Equation 1 below.

$$p = \sigma\left(\sum_j a_j |h_0^{(j)} - h_1^{(j)}|\right) \quad \text{[Equation 1]}$$

Referring to Equation 1 above, "p" indicates an output of the jointed fully-connected net layer FCN, "σ" indicates a function allowing the value of "p" to have a value between "0" and "1", and "a" indicates a weight used at the jointed fully-connected net layer FCN. As described above, the value of "p" may be calculated through Equation 1 above, and the value of "p" may indicate similarity between the value of "$h_0$" and the value of "$h_1$". In other words, the value of "p" may indicate similarity between the 0-th virtual stream and the first physical stream.

As described above, the storage device 1000 according to at least one example embodiment of the inventive concepts may map or cluster a virtual stream from the host 110 to a physical stream that is managed at the storage device 1000. In this case, the number of virtual streams may be more than the number of physical streams. The storage device 1000 may calculate distance information (i.e., stream similarity) by extracting representative values for respective physical streams based on virtual stream features of virtual streams mapped in advance to the physical streams and comparing each of the extracted representative values with the representative value of the virtual stream from the host 110. The storage device 1000 may select a physical stream corresponding to the virtual stream from the host 110 based on the calculated distance information.

According to at least one example embodiment of the inventive concepts, the above operations of extracting a representative value and calculating distance information may be performed through learning models learned in advance through the machine learning. Compared to the way to cluster a virtual stream based on a scheme simply designated in advance, because the above way of cluster a virtual stream uses various features of a virtual stream, the accuracy of stream similarity may be improved. That is, because virtual streams having similar features are mapped to the same physical stream, the performance and lifetime of a storage device may be improved.

Figure 13:
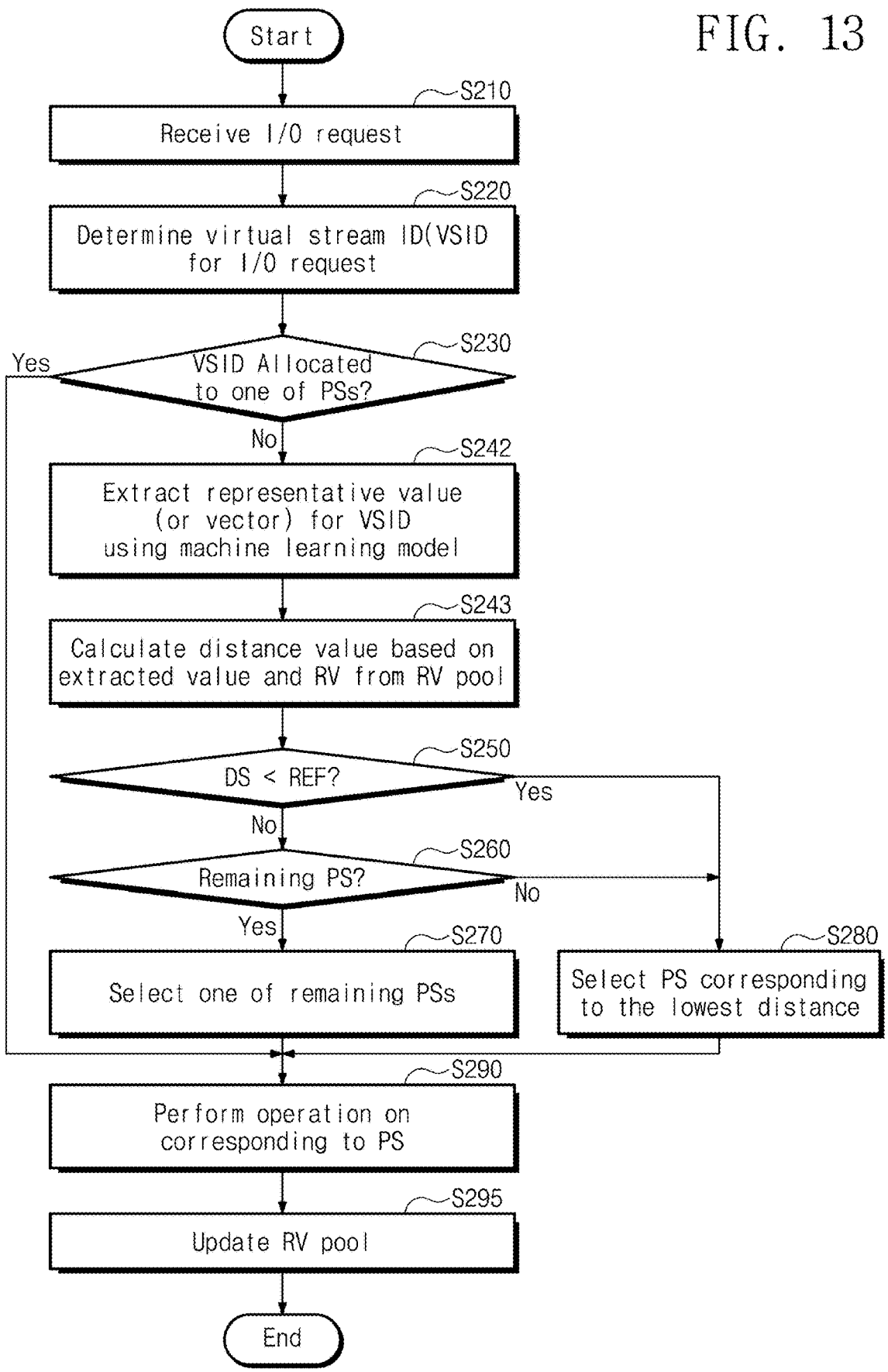
FIGS. 13 and 14 are a flowchart and a block diagram illustrating an operation of a storage device according to at least one example embodiment of the inventive concepts.
Figure 14:
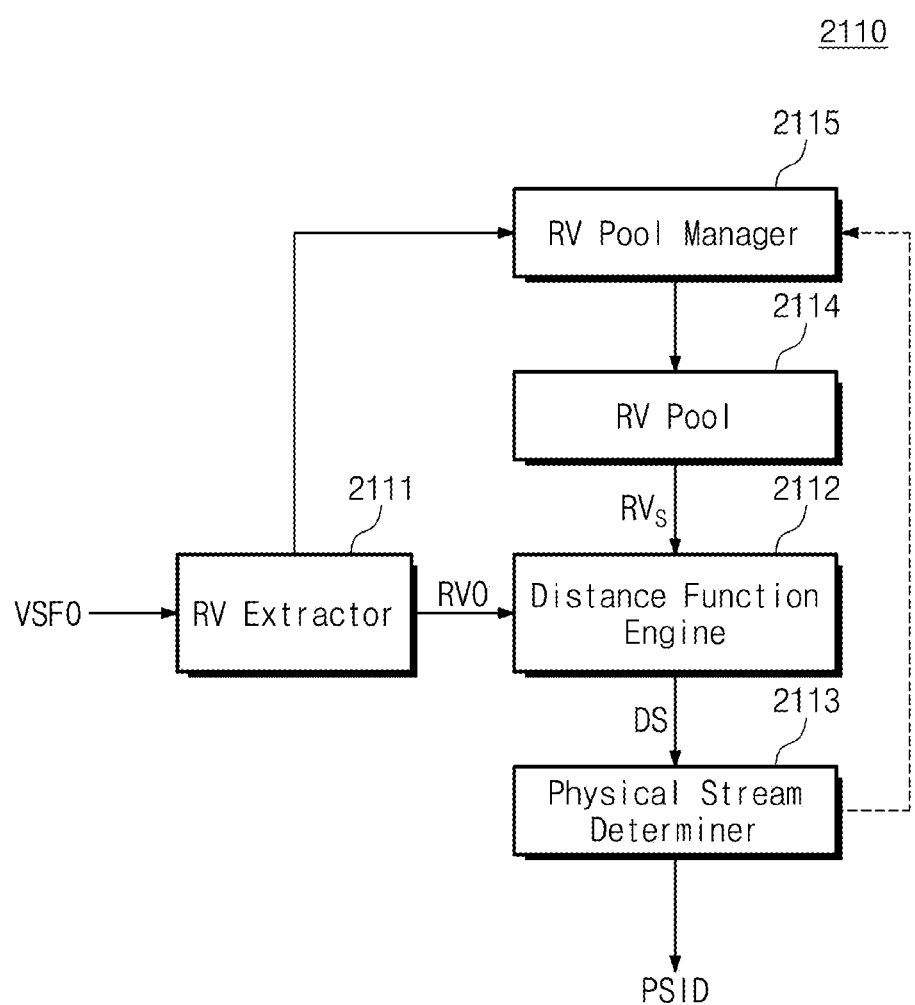

FIGS. 13 and 14 are a flowchart and a block diagram illustrating an operation of a storage device according to at least one example embodiment of the inventive concepts. For brevity of illustration and for convenience of description, the flowchart of FIG. 13 will be described with reference to the storage device 1000 of FIG. 1, and a stream mapping manager 2110 may correspond to the stream mapping manager 1110 of FIG. 1. That is, the stream mapping manager 1110 included in the storage controller 1100 of the storage device 1000 of FIG. 1 may be replaced with the stream mapping manager 2110 of FIG. 14.

Referring to FIGS. 1, 13, and 14, the storage device 1000 may perform operation S210 to operation S230. Operation S210 to operation S230 are described with reference to FIG. 6, and thus, additional description will be omitted to avoid redundancy.

In operation S242, the storage device 1000 may extract the 0-th representative value RV0 corresponding to the 0-th virtual stream, by using the machine learning model. In operation S243, the storage device 1000 may calculate the distance information DS based on a representative value pool 2114 and the 0-th representative value RV0.

Afterwards, the storage device 1000 may perform operation S250 to operation S290. Operation S250 to operation S290 are similar to operation S150 to operation S190 of FIG. 6, and thus, additional description will be omitted to avoid redundancy.

In operation S295, the storage device 1000 may update the representative value pool 2114. According to at least one example embodiment of the inventive concepts, the operation method according to the flowchart of FIG. 6 includes an operation (i.e., operation S141) of extracting a representative value for each physical stream. In contrast, the operation method according to the flowchart of FIG. 13 includes an operation (i.e., operation S141) of extracting a representative value for each physical stream. In detail, as illustrated in FIG. 14, the stream mapping manager 2110 capable of being included in the storage controller 1100 may include a representative value extractor 2111, a distance function engine 2112, a physical stream determiner 2113, the representative value pool 2114, and a representative value pool manager 2115.

The representative value extractor 2111 may be configured to extract the 0-th representative value RV0 of the 0-th virtual stream VSID0 corresponding to the request RQ from the host 110. That is, the representative value extractor 2111 may extract the 0-th representative value RV0 of the 0-th virtual stream VSID0 based on the 0-th extracting model EM0 described with reference to FIGS. 8 to 12.

Meanwhile, the representative value pool 2114 may store representative values respectively associated with a plurality of physical streams. For example, a representative value for each physical stream may be extracted or calculated through the virtual stream mapping operation or the virtual stream clustering operation associated with a virtual stream. The representative value extracted for each physical stream may be stored in the representative value pool 2114. That is, the representative value pool 2114 may store the representative values respectively corresponding to the plurality of physical streams, and thus, a representative value for each physical stream may be obtained without a separate extracting operation (i.e., operation S114 of FIG. 6 omitted).

The distance function engine 2112 may receive the 0-th representative value RV0 from the representative value extractor 2111 and may receive the representative values of the plurality of physical streams from the representative value pool 2114. The distance function engine 2112 may calculate the distance information DS based on the received representative values, and the physical stream determiner 2113 may select a physical stream based on the calculated distance information DS and may output the physical stream identifier PSID corresponding to the selected physical stream. Operations of the distance function engine 2112 and the physical stream determiner 2113 are described above, and thus, additional description will be omitted to avoid redundancy.

The representative value pool manager 2115 may update the representative value pool 2114 based on the physical stream identifier PSID selected by the physical stream determiner 2113. For example, in the case where a new physical stream (e.g., the 0-th physical stream) is selected for the 0-th virtual stream VSID0, the representative value pool manager 2115 may store the 0-th representative value RV0 in the representative value pool 2114 as a representative value of the 0-th physical stream thus selected. In the case where a previously allocated physical stream (e.g., the first physical stream) is selected for the 0-th virtual stream VSID0, the representative value pool manager 2115 may compare a representative value of the first physical stream previously stored in the representative value pool 2114 with the 0-th representative value RV0 and may select and update one of the representative value previously stored in the representative value pool 2114 and the 0-th representative value RV0. According to at least one example embodiment of the inventive concepts, the above update operation may be performed based on the machine learning.

As described above, with regard to a plurality of physical streams, a storage device according to at least one example embodiment of the inventive concepts may store and manage representative values extracted through the machine learning in a representative value pool. In this case, an operation of extracting a representative value of each physical stream every virtual stream clustering operation may be omitted. Accordingly, the performance and lifetime of the storage device may be improved.

Figure 15A:
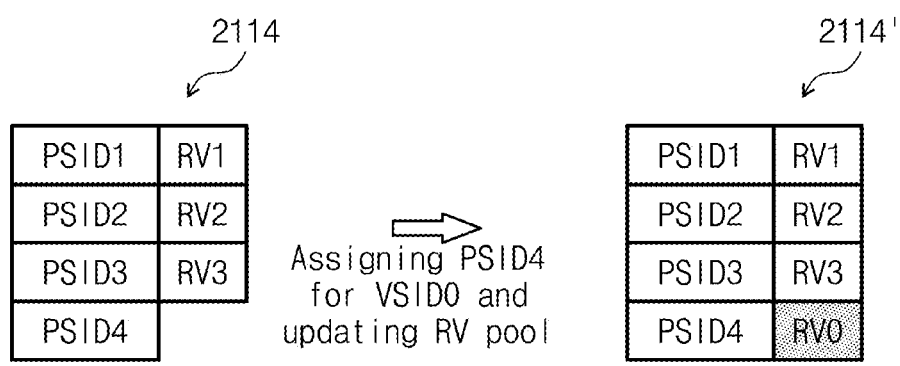
FIGS. 15A and 15B are diagrams for describing an operation of updating a representative value pool of FIG. 14.
Figure 15B:
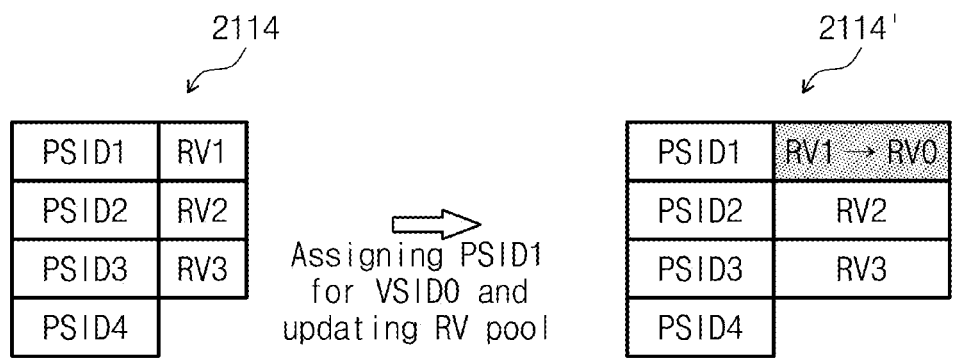

FIGS. 15A and 15B are diagrams for describing an operation of updating a representative value pool of FIG. 14. For the sake of brevity and for ease of description, components that are unnecessary to describe an operation of updating the representative value pool 2114 are omitted.

Referring to FIGS. 1, 14, 15A, and 15B, the representative value pool 2114 may be configured to store the first to third representative values RV1 to RV3 respectively corresponding to the first to third physical streams PSID1 to PSID3. The representative value pool 2114 may be in a state where a virtual stream is not yet assigned to the fourth physical stream PSID4.

In this case, as illustrated in FIG. 15A, the storage device 1000 may select the fourth physical stream PSID4 for the 0-th virtual stream VSID0 provided from the host 110. That is, the storage device 1000 may determine that a physical stream similar to the 0-th virtual stream VSID0 does not exist and may assign a new physical stream (e.g., the fourth physical stream PSID4) to the 0-th virtual stream VSID0. In this case, the representative value pool manager 2115 may update the representative value pool 2114 with the 0-th representative value RV0, which is extracted with respect to the 0-th virtual stream VSID0, as a representative value of the fourth physical stream PSID4. An updated representative value pool 2114' may store the first, second, third, and 0-th representative values RV1, RV2, RV3, and RV0 respectively corresponding to the first to fourth physical streams PSID1 to PSID4.

Alternatively, as illustrated in FIG. 15B, the storage device 1000 may select the first physical stream PSID1 for the 0-th virtual stream VSID0 provided from the host 110. That is, the storage device 1000 may determine that the first physical stream PSID1 is similar to the 0-th virtual stream VSID0 and may assign the first physical stream PSID1 to the 0-th virtual stream VSID0. In this case, the representative value pool manager 2115 may update the representative value pool 2114 with the 0-th representative value RV0, which is extracted with respect to the 0-th virtual stream VSID0, as a representative value of the first physical stream PSID1. The updated representative value pool 2114' may store the 0-th, second, and third representative values RV0, RV2, and RV3 respectively corresponding to the first to third physical streams PSID1 to PSID3.

According to at least one example embodiment of the inventive concepts, to update a representative value of the first physical stream PSID1 may be selectively performed. For example, in the representative value pool 2114, depending on a result of comparing the first representative value RV1 of the first physical stream PSID1 previously stored and the 0-th representative value RV0 of the 0-th virtual stream VSID0 newly assigned, one of the first representative value RV1 and the 0-th representative value RV0 may be updated as a representative value of the first physical stream PSID1. Alternatively a new representative value that is obtained by combining the first representative value RV1 and the 0-th representative value RV0 may be updated as a representative value of the first physical stream PSID1. The above selecting or combining operation may be determined based on the machine learning.

Figure 16:
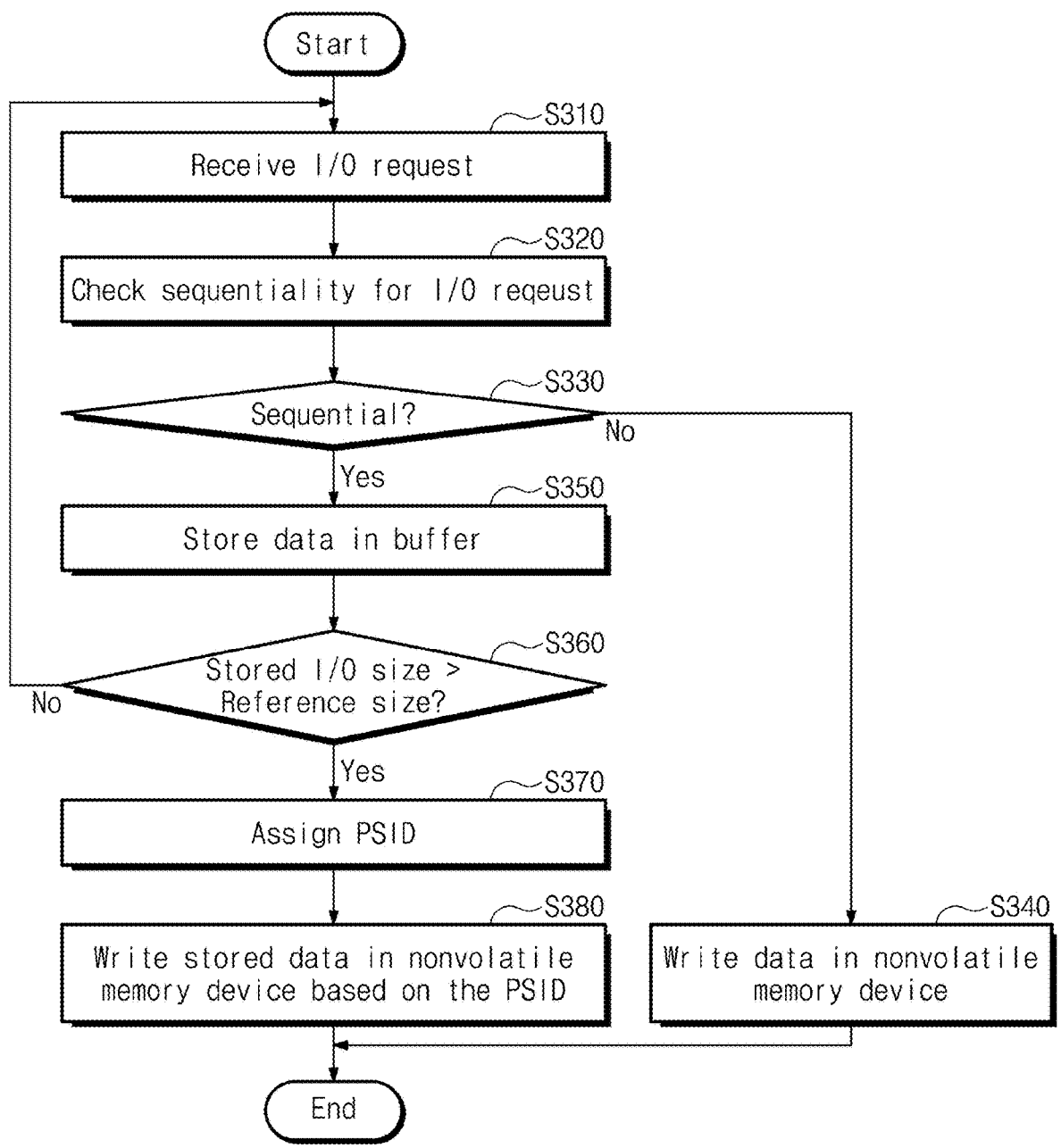
FIG. 16 is a flowchart illustrating an operation of a storage device of FIG. 1.

FIG. 16 is a flowchart illustrating an operation of a storage device of FIG. 1. According to at least one example embodiment of the inventive concepts, the operation method according to the flowchart of FIG. 16 may be performed without a virtual stream or a virtual stream identifier VSID. For example, the operation method according to the flowchart of FIG. 16 may be an operation of assigning a physical stream to requests having sequentiality (i.e., not a random write request but a sequential write request).

Referring to FIGS. 1 and 16, in operation S310, the storage device 1000 may receive the input/output request RQ from the host 110. According to at least one example embodiment of the inventive concepts, the input/output request RQ may be a write request.

In operation S320, the storage device 1000 may check sequentiality of the received input/output request RQ. For example, the storage device 1000 may manage a hash table associated with a logical block address of the request RQ received from the host 110. The hash table may include information of accumulating logical block addresses of a plurality of input/output requests received from the host 110. The storage device 1000 may determine whether the logical block address of the received input/output request RQ is sequential (or continuous) to previous input/output requests or stored data, based on the hash table.

When it is determined in operation S330 that the input/output request RQ is not sequential or continuous, the storage device 1000 may perform operation S340. In operation S340, the storage device 1000 may write data in the nonvolatile memory device 1200 in response to the received input/output request RQ. According to at least one example embodiment of the inventive concepts, the data written in operation S340 may be random data (i.e., data out of sequence).

When it is determined in operation S330 that the input/output request RQ is sequential or continuous, the storage device 1000 may perform operation S350. In operation S350, the storage device 1000 may store the data corresponding to the received input/output request RQ in a buffer. For example, the storage device 1000 may include a separate data buffer (e.g., a DRAM or an SRAM). The storage device 1000 may store the data corresponding to the received input/output request RQ in the data buffer.

In operation S360, the storage device 1000 may determine whether a size (i.e., an I/O size) of the data stored in the buffer is larger than a reference size. When the size of the data stored in the buffer is not larger than the reference size, the storage device 1000 may return to operation S310.

When the size of the data stored in the buffer is larger than the reference size, in operation S370, the storage device 1000 may assign a physical stream to the data stored in the buffer. According to at least one example embodiment of the inventive concepts, operation S370 may be performed based on the physical stream selecting or assigning method described with reference to FIGS. 1 to 15B. For example, the storage device 1000 may extract or manage representative values of a plurality of physical streams. The storage device 1000 may extract a representative value of the data stored in the buffer. The storage device 1000 may calculate distance information based on the representative value of the data stored in the buffer and the representative values of the physical streams and may assign one of the plurality of physical streams based on the calculated distance information. That is, operation S370 may be similar to that of the above embodiments except that random data and sequential data are classified based on a virtual stream or a virtual stream identifier. Thus, additional description will be omitted to avoid redundancy. According to at least one example embodiment of the inventive concepts, operation S370 may be performed based on the machine learning, as described above.

In operation S380, the storage device 1000 may store the data (i.e., the data stored in the buffer) in the nonvolatile memory device 1200 based on the assigned physical stream PSID. For example, the storage device 1000 may store the data in a memory block included in the allocated physical stream PSID. Alternatively, the storage device 1000 may store data in a specific memory block and may allow the specific memory block to be included in the assigned physical stream PSID.

According to at least some example embodiments of the inventive concepts, the storage device 1000 may determine whether an input/output request received from the host 110 is associated with random data or sequential data, based on burstness, and may assign a physical stream having a similar feature to sequential data. In this case, even though a logical block address is out of the burstness due to page caching occurring at a kernel on the host 110, because a physical stream is assigned to data based on a representative value of each physical stream, data having similar features may be managed at the same physical stream. Accordingly, the performance and lifetime of the storage device may be improved.

Figure 17:
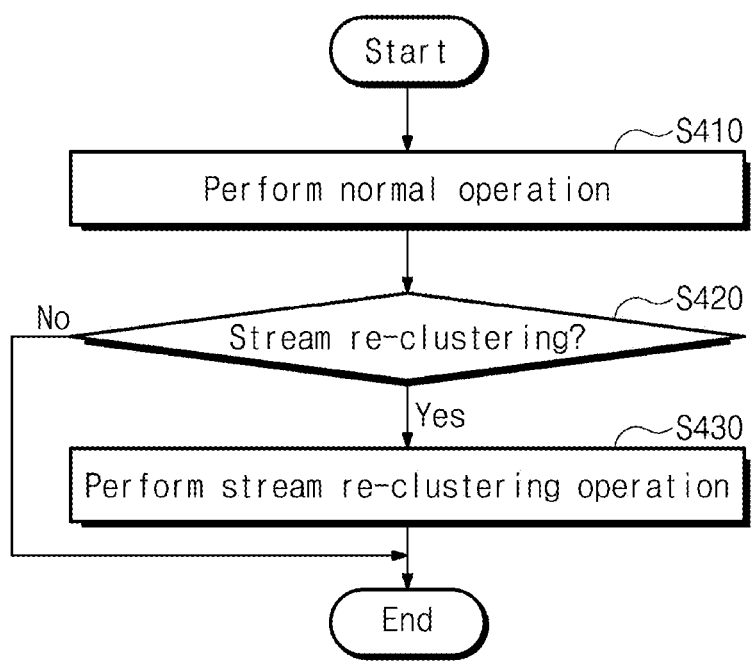
FIG. 17 is a flowchart illustrating an operation of a storage device of FIG. 1.

FIG. 17 is a flowchart illustrating an operation of a storage device of FIG. 1. Referring to FIGS. 1 and 17, in operation S410, the storage device 1000 may perform a normal operation. For example, the storage device 1000 may operate based on the operation method described with reference to FIGS. 1 to 16.

In operation S420, the storage device 1000 may determine whether stream re-clustering is required. For example, the storage device 1000 may re-cluster physical streams in response to an explicit request of the host 110. Alternatively, the storage device 1000 may re-cluster physical streams under a specific condition. According to at least one example embodiment of the inventive concepts, the re-clustering of physical streams may include re-clustering information necessary to assign a physical stream, such as re-clustering a mapping relationship between physical streams and virtual streams, re-clustering representative values of physical streams, adjusting the number of physical streams, and adjusting the number of virtual streams.

According to at least one example embodiment of the inventive concepts, the specific condition may include various conditions such as the case where data included in two or more physical streams have similarity, the case where the similarity of data included in a specific physical stream markedly decreases, the case where a new physical stream not assigned is required, and the case where it is necessary to distribute data included in one physical stream into two physical streams.

When the stream re-clustering is required, in operation S430, the storage device 1000 may perform a stream re-clustering operation. For example, in the stream re-clustering operation, the storage device 1000 may perform training on learning models (e.g., selecting models or extracting models) based on the collected stream information SDB. Alternatively, in the stream re-clustering operation, the storage device 1000 may distribute data included in one physical stream into at least two physical streams. Alternatively, in the stream re-clustering operation, the storage device 1000 may integrate data included in at least two physical streams into one physical stream. Alternatively, in the stream re-clustering operation, the storage device 1000 may re-cluster representative values for respective physical streams. The above operations are examples, and at least some example embodiments of the inventive concepts are not limited thereto. For example, in the stream re-clustering operation, the storage device 1000 may re-cluster a variety of information necessary to assign a physical stream.

Figure 18:
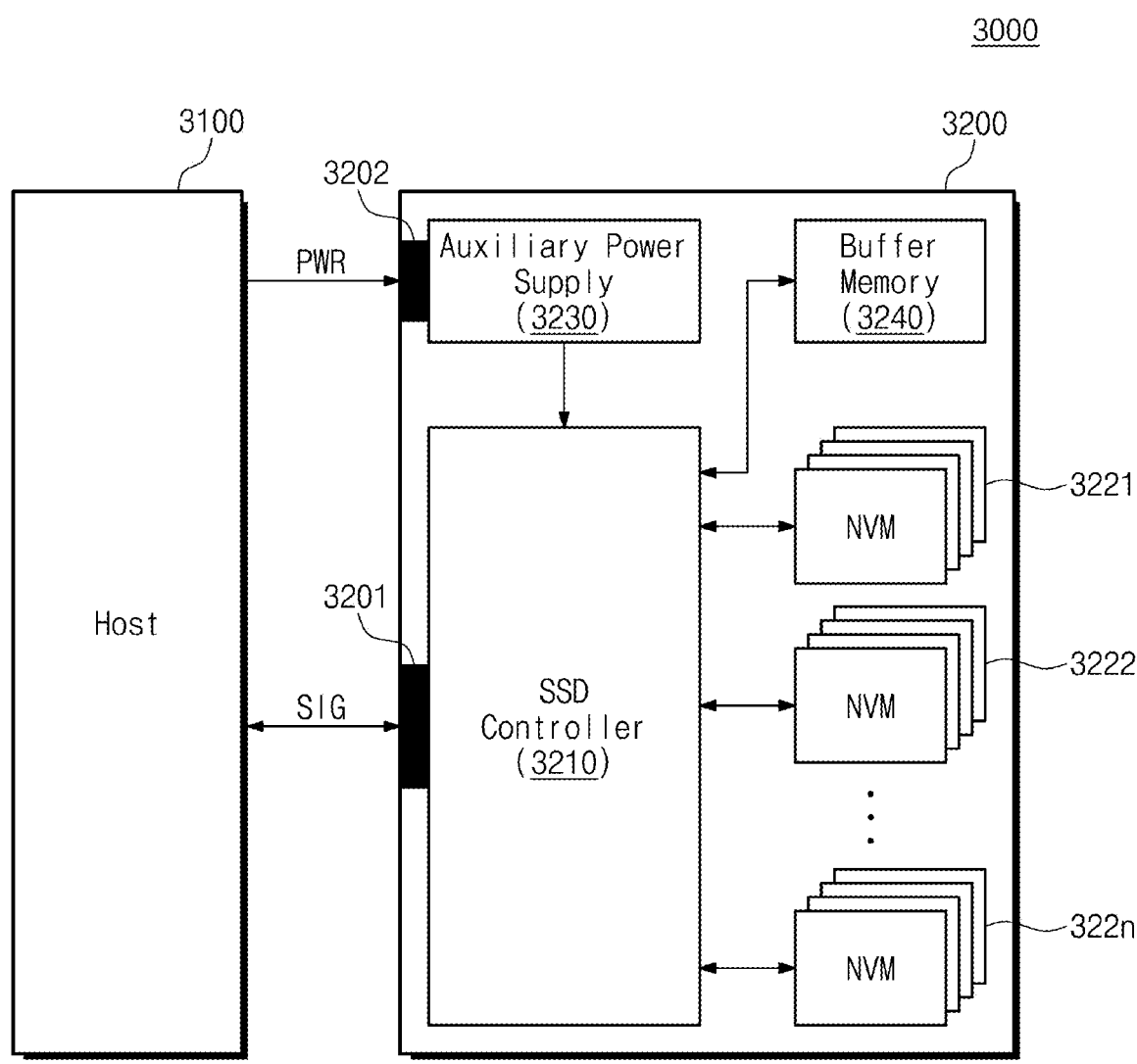
FIG. 18 is a block diagram illustrating a solid state drive system to which a storage system according to at least one example embodiment of the inventive concepts is applied.

FIG. 18 is a block diagram illustrating a solid state drive (SSD) system to which a storage system according to at least one example embodiment of the inventive concepts is applied. Referring to FIG. 18, an SSD system 3000 may include a host 3100 and a storage device 3200. According to at least one example embodiment of the inventive concepts, the host 3100 and the storage device 3200 may be the host 110 and the storage device 1000 described with reference to FIGS. 1 to 17 or may operate based on the operation method described with reference to FIGS. 1 to 17.

The storage device 3200 may exchange signals SIG with the host 3100 through a signal connector 3201 and may be supplied with a power PWR through a power connector 3202. The storage device 3200 includes an SSD controller 3210, a plurality of nonvolatile memories 3221 to 322n, an auxiliary power supply 3230, and a buffer memory 3240.

The SSD controller 3210 may control the plurality of nonvolatile memories 3221 to 322n in response to the signals SIG received from the host 3100. The plurality of nonvolatile memories 3221 to 322n may operate under control of the SSD controller 3210. The auxiliary power supply 3230 is connected with the host 3100 through the power connector 3202. The auxiliary power supply 3230 may be charged by the power PWR supplied from the host 3100. When the power PWR is not smoothly supplied from the host 3100, the auxiliary power supply 3230 may power the storage device 3200.

The buffer memory 3240 may be used as a buffer memory of the storage device 3200. According to at least one example embodiment of the inventive concepts, each of the stream mapping managers 1110 and 2110 described with reference to FIGS. 1 to 17 may perform the above operations by using information stored in the buffer memory 3240.

Figure 19:
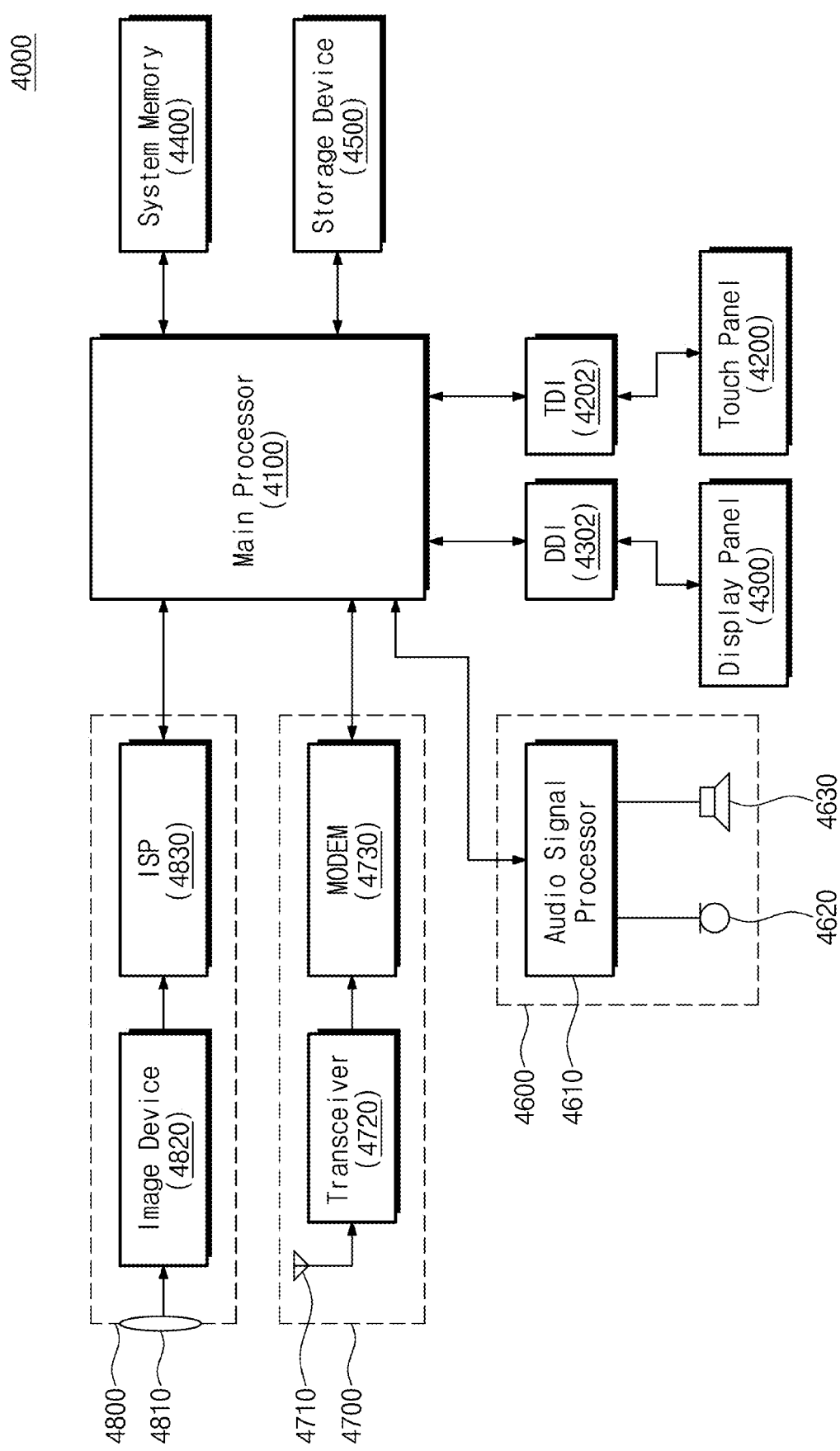
FIG. 19 is a block diagram illustrating an electronic device to which a storage system according to at least one example embodiment of the inventive concepts is applied.

FIG. 19 is a block diagram illustrating an electronic device to which a storage system according to at least one example embodiment of the inventive concepts is applied. Referring to FIG. 19, an electronic device 4000 may include a main processor 4100, a touch panel 4200, a touch driver integrated circuit 4202, a display panel 4300, a display driver integrated circuit 4302, a system memory 4400, a storage device 4500, an audio processor 4600, a communication block 4700, and an image processor 4800. According to at least one example embodiment of the inventive concepts, the electronic device 4000 may be one of various electronic devices such as a personal computer, a laptop computer, a workstation, a portable communication terminal, a personal digital assistant (PDA), a portable media player (PMP), a digital camera, a smartphone, a tablet computer, and a wearable device.

The main processor 4100 may control overall operations of the electronic device 4000. The main processor 4100 may control/manage operations of the components of the electronic device 4000. The main processor 4100 may process various operations for the purpose of operating the electronic device 4000.

The touch panel 4200 may be configured to sense a touch input from a user under control of the touch driver integrated circuit 4202. The display panel 4300 may be configured to display image information under control of the display driver integrated circuit 4302.

The system memory 4400 may store data that are used for an operation of the electronic device 4000. For example, the system memory 4400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The storage device 4500 may store data regardless of whether a power is supplied. For example, the storage device 4500 may include at least one of various nonvolatile memories such as a flash memory, a PRAM, an MRAM, a ReRAM, and a FRAM. For example, the storage device 4500 may include an embedded memory and/or a removable memory of the electronic device 4000. According to at least one example embodiment of the inventive concepts, the storage device 4500 may be the storage device described with reference to FIGS. 1 to 17 or may operate based on the operation method described with reference to FIGS. 1 to 17.

The audio processor 4600 may process an audio signal by using an audio signal processor 4610. The audio signal processor 4610 may receive an audio input through a microphone 4620 or may provide an audio output through a speaker 4630.

The communication block 4700 may exchange signals with an external device/system through an antenna 4710. A transceiver 4720 and a modulator/demodulator (MODEM) 4730 of the communication block 4700 may process signals exchanged with the external device/system in compliance with at least one of various wireless communication protocols: long term evolution (LTE), worldwide interoperability for microwave access (WiMax), global system for mobile communication (GSM), code division multiple access (CDMA), Bluetooth, near field communication (NFC), wireless fidelity (Wi-Fi), and radio frequency identification (RFID).

The image processor 4800 may receive a light through a lens 4810. An image device 4820 and an image signal processor 4830 included in the image processor 4800 may generate image information about an external object, based on a received light.

Figure 20:
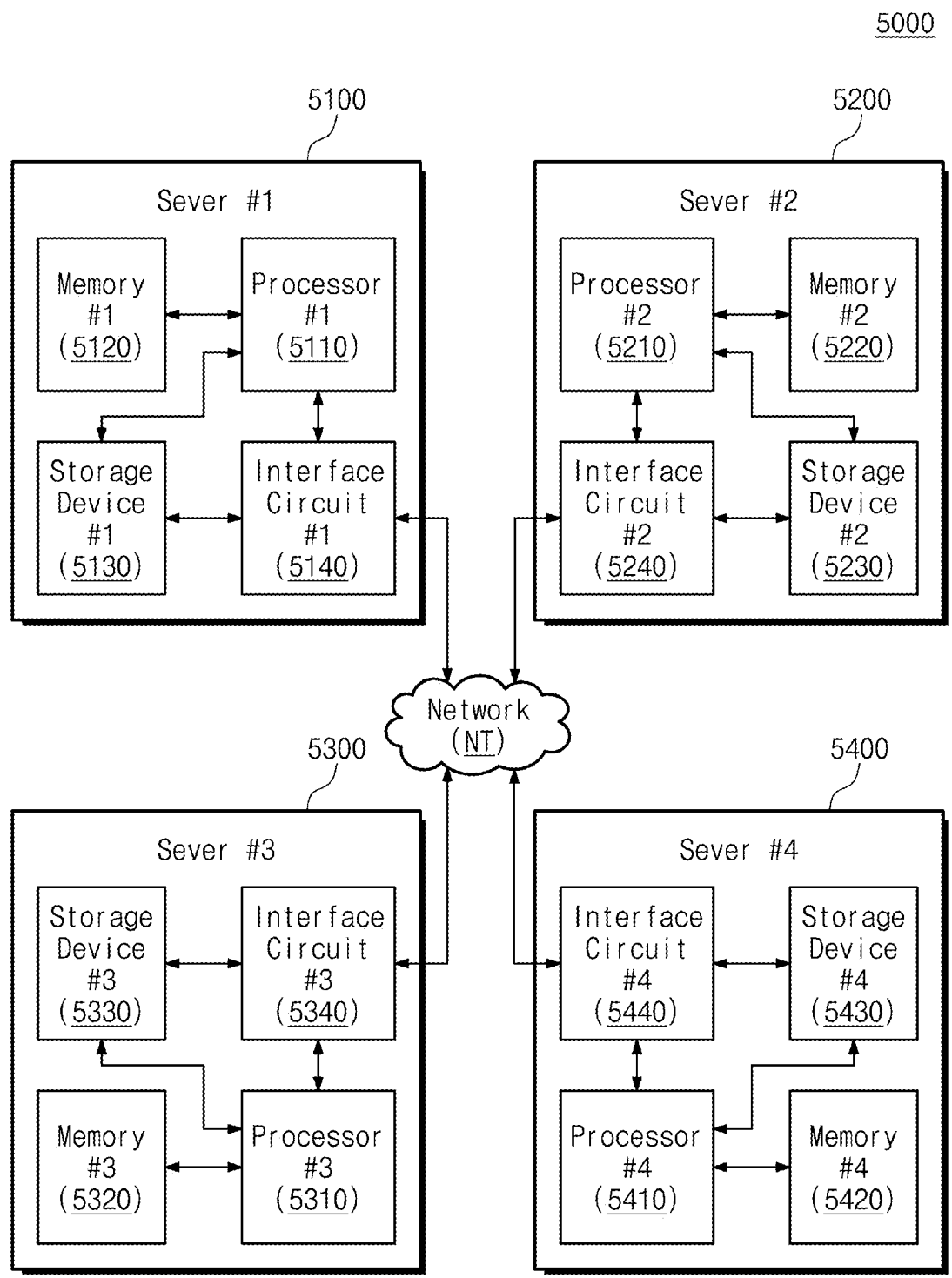
FIG. 20 is a block diagram illustrating a data center to which a storage system according to at least one example embodiment of the inventive concepts is applied.

FIG. 20 is a block diagram illustrating a data center to which a storage system according to at least one example embodiment of the inventive concepts is applied. Referring to FIG. 20, a data center 5000 may include a plurality of computing nodes 5100 to 5400. The plurality of computing nodes 5100 to 5400 may communicate with each other over a network NT. According to at least one example embodiment of the inventive concepts, the network NT may include at least one of various communication protocols such as Fibre channel, iSCSI protocol, FCoE, NAS, and NVMe-oF.

The plurality of computing nodes 5100 to 5400 may include processors 5110, 5210, 5310, and 5410, memories 5120, 5220, 5320, and 5420, storage devices 5130, 5230, 5330, and 5430, and interface circuits 5140, 5240, 5340, and 5440.

For example, the first computing node 5100 may include a first processor 5110, a first memory 5120, a first storage device 5130, and a first interface circuit 5140. According to at least one example embodiment of the inventive concepts, the first processor 5110 may be implemented with a single core or a multi-core. The first memory 5120 may include a memory such as a DRAM, an SDRAM, an SRAM, a 3D XPoint memory, an MRAM, a PRAM, a FeRAM, or a ReRAM. The first storage device 5130 may be a high-capacity storage medium such as a hard disk drive (HDD) or a solid state drive (SSD). The first interface circuit 5140 may be a network interface controller (NIC) configured to support communication over the network NT.

According to at least one example embodiment of the inventive concepts, the first processor 5110 of the first computing node 5100 may be configured to access the first memory 5120. Alternatively, the first processor 5110 of the first computing node 5100 may be configured to access the memories 5220, 5320, and 5420 of the second to fourth computing nodes 5200, 5300, and 5400 over the network NT. According to at least one example embodiment of the inventive concepts, the first processor 5110 of the first computing node 5100 may be configured to access the first storage device 5130. Alternatively, the first processor 5110 of the first computing node 5100 may be configured to access the storage devices 5230, 5330, and 5430 of the second to fourth computing nodes 5200, 5300, and 5400 over the network NT. Operations of the second to fourth computing nodes 5200 to 5400 may be similar to the operation of the first computing node 5100 described above, and thus, additional description will be omitted to avoid redundancy.

According to at least one example embodiment of the inventive concepts, various applications may be executed at the data center 5000. The applications may be configured to execute an instruction for data movement or copy between the computing nodes 5100 to 5400 or may be configured to execute instructions for combining, processing, or reproducing a variety of information present on the computing nodes 5100 to 5400. According to at least one example embodiment of the inventive concepts, the data center 5000 may be used for high-performance computing (HPC) (e.g., finance, petroleum, materials science, meteorological prediction), an enterprise application (e.g., scale out database), a big data application (e.g., NoSQL database or in-memory replication).

According to at least one example embodiment of the inventive concepts, at least one of the plurality of computing nodes 5100 to 5400 may be an application server. The application server may be configured to execute an application configured to perform various operations at the data center 5000. At least one of the plurality of computing nodes 5100 to 5400 may be a storage server. The storage server may be configured to store data that are generated or managed at the data center 5000. The plurality of computing nodes 5100 to 5400 included in the data center 5000 may be placed at the same site or may be present at sites physically separated from each other. According to at least one example embodiment of the inventive concepts, the plurality of computing nodes 5100 to 5400 included in the data center 5000 may be implemented by the same memory technology or may be implemented by different memory technologies. According to at least one example embodiment of the inventive concepts, the number of computing nodes 5100 to 5400 included in the data center 5000 is an example, and at least some example embodiments of the inventive concepts are not limited thereto. Also, in each computing node, the number of processors, the number of memories, and the number of storage devices are examples, and at least some example embodiments of the inventive concepts are not limited thereto. According to at least one example embodiment of the inventive concepts, the storage devices 5130, 5230, 5330, and 5430 respectively included in the computing nodes 5100, 5200, 5300, and 5400 may operate based on the operation method described with reference to FIGS. 1 to 17.

According to at least one example embodiment of the inventive concepts, a storage device may extract representative values of a virtual stream and internally managed physical streams and may determine similarity between the virtual stream and the physical streams based on the extracted representative values. The storage device may assign a physical stream to a virtual stream based on the similarity. Accordingly, because virtual streams having similar features are mapped to the same physical stream, the performance and lifetime of a storage device may be improved.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. An operation method of a storage device configured to manage a plurality of nonvolatile memories with a plurality of physical streams, the method comprising:
    receiving an input/output request from an external host device;
    determining a 0-th virtual stream identifier corresponding to the received input/output request;
    extracting a 0-th representative value from a 0-th virtual stream feature of a 0-th virtual stream corresponding to the determined 0-th virtual stream identifier;
    extracting a first representative value and a second representative value respectively corresponding to a first physical stream and a second physical stream of the plurality of physical streams;
    calculating distance information including a first similarity between the 0-th virtual stream and the first physical stream and a second similarity between the 0-th virtual stream and the second physical stream, based on the extracted 0-th, first, and second representative values;
    assigning one of the plurality of physical streams to the 0-th virtual stream, based on the distance information; and
    performing an operation corresponding to the input/output request, at the assigned physical stream,
    wherein the extracting of the 0-th representative value, the extracting of the first representative value and the second representative value, and the calculating of the distance information are performed by using a learning model learned in advance through machine learning.

2. The method of claim 1, wherein the learning model includes a 0-th extracting model configured to extract the 0-th representative value from the 0-th virtual stream feature.

3. The method of claim 2,
    wherein the learning model further includes a first selecting model, a second selecting model, a first extracting model, and a second extracting model,
    wherein the extracting of the first representative value and the second representative value includes:
        selecting a first virtual stream feature corresponding to at least one of one or more first virtual streams mapped to the first physical stream, by using the first selecting model;
        selecting a second virtual stream feature corresponding to at least one of one or more second virtual streams mapped to the second physical stream, by using the second selecting model;
        extracting the first representative value from the first virtual stream feature by using the first extracting model; and
        extracting the second representative value from the second virtual stream feature by using the second extracting model.

4. The method of claim 3, wherein the 0-th virtual stream feature includes information about a 0-th throughput, a 0-th logical block address range, a 0-th updateness, a 0-th sequentiality, and a 0-th burstness of the 0-th virtual stream corresponding to the 0-th virtual stream identifier,
    wherein the first virtual stream feature includes information about a first throughput, a first logical block address range, a first updateness, a first sequentiality, and a first burstness of the at least one of the at least one or more first virtual streams, and
    wherein the second virtual stream feature includes information about a second throughput, a second logical block address range, a second updateness, a second sequentiality, and a second burstness of the at least one of the at least one or more second virtual streams.

5. The method of claim 4, further comprising:
    monitoring, by an input/output monitor, the 0-th virtual stream feature, the first virtual stream feature, and the second virtual stream feature.

6. The method of claim 4,
    wherein the 0-th representative value includes a 0-th value that corresponds to the information about the 0-th throughput, the information about the 0-th logical block address range, the information about the 0-th updateness, the information about the 0-th sequentiality, the information about the 0-th burstness, or a combination of at least two thereof,
    wherein the first representative value includes a first value that corresponds to the information about the first throughput, the information about the first logical block address range, the information about the first updateness, the information about the first sequentiality, the information about the first burstness, or a combination of at least two thereof,
    wherein the second representative value includes a second value that corresponds to the information about the second throughput, the information about the second logical block address range, the information about the second updateness, the information about the second sequentiality, the information about the second burstness, or a combination of at least two thereof, and wherein the 0-th value included in the 0-th representative value, the first value included in the first representative value, and the second value included in the second representative value are of the same type.

7. The method of claim 4, wherein the 0-th representative value includes a 0-th value that corresponds to the information about the 0-th throughput, the information about the 0-th logical block address range, the information about the 0-th updateness, the information about the 0-th sequentiality, the information about the 0-th burstness, or a combination of at least two thereof,
wherein the first representative value includes a first value that corresponds to the information about the first throughput, the information about the first logical block address range, the information about the first updateness, the information about the first sequentiality, the information about the first burstness, or a combination of at least two thereof,
wherein the second representative value includes a second value that corresponds to the information about the second throughput, the information about the second logical block address range, the information about the second updateness, the information about the second sequentiality, the information about the second burstness, or a combination of at least two thereof,
wherein the first value included in the first representative value corresponds to a first type,
wherein the second value included in the second representative value corresponds to a second type different from the first type, and
wherein the 0-th value included in the 0-th representative value corresponds to both the first type and the second type.

8. The method of claim 1, wherein the assigning of the one of the plurality of physical streams to the 0-th virtual stream, based on the distance information includes:
determining whether at least one of the first similarity and the second similarity included in the distance information is lower than a reference value; and
assigning the stream, which corresponds to the lowest similarity of the first similarity and the second similarity, from among the first and second physical streams to the 0-th virtual stream when at least one of the first similarity and the second similarity included in the distance information is lower than the reference value and assigning a third physical stream, which is different from the first and second physical streams, from among the plurality of physical streams to the 0-th virtual stream, when both the first similarity and the second similarity included in the distance information are not lower than the reference value.

9. The method of claim 1, further comprising:
updating a stream mapping table configured to store mapping information between the plurality of physical streams and a plurality of virtual streams based on the 0-th virtual stream identifier and a physical stream identifier of the assigned physical stream.

10. The method of claim 9, wherein a number of the plurality of virtual streams is more than a number of the plurality of physical streams.

11. The method of claim 1, wherein the input/output request includes information about the 0-th virtual stream identifier.

12. The method of claim 1, wherein the 0-th virtual stream identifier is determined based on a logical block address or a data size included in the input/output request.

13. A storage device comprising:
a plurality of nonvolatile memories; and
a storage controller including processing circuitry configured to manage the plurality of nonvolatile memories with a plurality of physical streams and to assign one of the plurality of physical streams to a 0-th virtual stream corresponding to an input/output request from an external host device,
wherein the storage controller further includes a memory configured to store stream information including a plurality of virtual stream features respectively corresponding to the plurality of physical streams, and
wherein the processing circuitry is configured to, based on a machine learning model learned in advance through machine learning,
extract a 0-th representative value from a 0-th virtual stream feature corresponding to the 0-th virtual stream,
extract a plurality of representative values respectively corresponding to the plurality of physical streams from the stream information,
calculate distance information indicating a similarity between the 0-th virtual stream and each of the plurality of physical streams, based on the extracted 0-th representative value and the extracted plurality of representative values, and
assign one of the plurality of physical streams to the 0-th virtual stream based on the distance information.

14. The storage device of claim 13, wherein the processing circuitry is configured to,
extract the 0-th representative value and the plurality of representative values based on the 0-th virtual stream feature and the stream information;
calculate the distance information indicating the similarity between each of the plurality of representative values and the 0-th representative value; and
assign the one of the plurality of physical streams based on the distance information.

15. The storage device of claim 14,
wherein the processing circuitry is further configured to,
select a plurality of selection virtual stream features respectively corresponding to the plurality of physical streams from among a plurality of virtual stream features included in the stream information by using a plurality of selecting models; and
extract the plurality of representative values respectively corresponding to the plurality of physical streams from the plurality of selection virtual stream features by using a plurality of extracting models and to extract the 0-th representative value from the 0-th virtual stream feature by using a 0-th extracting model, and
wherein the plurality of selecting models and the plurality of extracting models are included in the learning model.

16. The storage device of claim 15, wherein the 0-th extracting model is a 0-th convolution layer configured to extract the 0-th representative value from the 0-th virtual stream feature,
wherein a first extracting model of the plurality of extracting models is a first convolution layer configured to extract a first representative value, from among the plurality of representative values, from a first virtual stream feature corresponding to a first physical stream of the plurality of physical streams from among the plurality of selection virtual stream features, wherein the distance function engine includes a jointed fully-connected layer configured to calculate a first similarity between the 0-th virtual stream and the first physical stream based on the 0-th representative value and the first representative value, and wherein the 0-th convolution layer and the first convolution layer are further configured to share a plurality of learning parameters.

17. The storage device of claim 13, wherein the processing circuitry is further configured to monitor the 0-th virtual stream feature and the plurality of virtual stream features.

18. The storage device of claim 17, wherein the 0-th virtual stream feature includes information about a throughput, a logical block address range, an updateness, a sequentiality, and a burstness of the 0-th virtual stream, and wherein the plurality of virtual stream features include information about a throughput, a logical block address range, an updateness, a sequentiality, and a burstness of each of a plurality of virtual streams assigned to each of the plurality of physical streams.

19. An operation method of a storage device configured to manage a plurality of nonvolatile memories with a plurality of physical streams, the method comprising:

receiving an input/output request from an external host device;

determining a 0-th virtual stream identifier corresponding to the received input/output request;

extracting a 0-th representative value from a 0-th virtual stream feature of a 0-th virtual stream corresponding to the determined 0-th virtual stream identifier;

obtaining a first representative value and a second representative value respectively corresponding to a first physical stream and a second physical stream of the plurality of physical streams from a representative value pool;

calculating distance information including a first similarity between the 0-th virtual stream and the first physical stream and a second similarity between the 0-th virtual stream and the second physical stream, based on the obtained first and second representative values;

assigning one of the plurality of physical streams to the 0-th virtual stream, based on the distance information;

performing an operation corresponding to the input/output request, at the assigned physical stream; and updating the representative value pool based on the 0-th representative value and a physical stream identifier corresponding to the assigned physical stream, wherein the extracting of the 0-th representative value and the calculating of the distance information are performed by using a learning model learned in advance through machine learning.

20. The method of claim 19, wherein the learning model includes a 0-th extracting model configured to extract the 0-th representative value from the 0-th virtual stream feature.

* * * * *